United States Patent
Hara et al.

(10) Patent No.: US 7,170,633 B2
(45) Date of Patent: Jan. 30, 2007

(54) IMAGING APPARATUS

(75) Inventors: Yoshihiro Hara, Osaka (JP); Rieko Izume, Osaka (JP)

(73) Assignee: Minolta Co., Ltd., Osaka (JP)

( * ) Notice: Subject to any disclaimer, the term of this patent is extended or adjusted under 35 U.S.C. 154(b) by 1183 days.

(21) Appl. No.: 10/054,160

(22) Filed: Jan. 22, 2002

(65) Prior Publication Data

US 2002/0097441 A1    Jul. 25, 2002

(30) Foreign Application Priority Data

Jan. 23, 2001  (JP)  ............................. 2001-014301
Jan. 23, 2001  (JP)  ............................. 2001-014302

(51) Int. Cl.
  *H04N 1/40*  (2006.01)
  *H04N 1/409*  (2006.01)
  *H04N 1/58*  (2006.01)
  *H04N 1/60*  (2006.01)
  *H04N 5/225*  (2006.01)
  *H04N 5/235*  (2006.01)
  *H04N 9/04*  (2006.01)

(52) U.S. Cl. ...................... 358/1.9; 358/3.27; 358/518; 358/524; 358/530; 358/532; 348/222.1; 348/223.1; 348/229.1; 348/252; 348/231.1; 348/231.6

(58) Field of Classification Search .................. 358/1.9, 358/3.26, 3.27, 516, 518, 523, 524, 527, 358/530, 532, 447, 448, 463; 348/222.1, 348/223.1, 225.1, 231.99, 231.3, 231.6, 241, 348/252, 229.1, 333.01
See application file for complete search history.

(56) References Cited

U.S. PATENT DOCUMENTS

| | | | | |
|---|---|---|---|---|
| 4,692,797 A * | 9/1987 | Matsumoto | .................. | 358/518 |
| 5,309,228 A | 5/1994 | Nakamura | .................. | 358/500 |
| 6,067,420 A | 5/2000 | Hara et al. | ..................... | 396/55 |
| 6,842,536 B2 * | 1/2005 | Aihara | ........................ | 382/167 |
| 6,850,272 B1 * | 2/2005 | Terashita | .................. | 348/223.1 |
| 6,996,270 B1 * | 2/2006 | Ito | ............................. | 358/518 |

FOREIGN PATENT DOCUMENTS

| | | | |
|---|---|---|---|
| JP | 11-136568 A | 5/1999 |
| JP | 11-298768 A | 10/1999 |

* cited by examiner

*Primary Examiner*—Scott A. Rogers
(74) *Attorney, Agent, or Firm*—Sidley Austin LLP

(57) ABSTRACT

In an imaging apparatus such as a digital still camera, a scene is judged with using an image data outputted from an area sensor in a preparation state in which an image displayed on a monitor display serves as a viewfinder, and another image data to be recorded in a recording medium in an image recording mode is compensated corresponding to a result of judgment of the scene. By such the compensation, an image using the image data recorded in the recording medium can properly be reproduced by an image outputting apparatus such as a printer.

21 Claims, 20 Drawing Sheets

FIG. 15A

| 0 | -1 | 0 |
|---|----|---|
| -1 | 5 | -1 |
| 0 | -1 | 0 |

FIG. 15B

| 0 | -0.3 | 0 |
|---|------|---|
| -0.3 | 2.2 | -0.3 |
| 0 | -0.3 | 0 |

FIG. 15C

| 0 | -0.2 | 0 |
|---|------|---|
| -0.2 | 1.8 | -0.2 |
| 0 | -0.2 | 0 |

FIG. 17

| Image Information |
|---|
| COMPENSATION VALUE OF RED BALANCING (ΔR) |
| COMPENSATION VALUE OF GREEN BALANCING (ΔG) |
| COMPENSATION VALUE OF BLUE BALANCING (ΔB) |
| RED DATA TABLE (Rt) |
| GREEN DATA TABLE (Rt) |
| BLUE DATA TABLE (Rt) |
| EDGE EMPHASIZING FILTERS |
| JUDGMENT OF SCENES |
| EXISTENCE OF A PERSON (Y/N) |
| NUMBER OF PERSONS |
| POSITION AND SIZE (POSITION 1) |
| POSITION AND SIZE (POSITION 2) |
| POSITION AND SIZE (POSITION 3) |
| FINISH OF IMAGE INFORMATION |
| IMAGE DATA |

FIG.22

TABLE 1

| JUDGMENT OF SCENE | | | JUDGING METHOD | |
|---|---|---|---|---|
| | SCENES | CONTENTS | PERSON | COLOR HISTOGRAM |
| S1 | SNAPSHOT | NORMAL SCENE (EXCEPT THE FOLLOWINGS) | - | - |
| S2 | PORTRAIT | LARGE FACE PORTION | YES (LARGE) | NO COLOR FOGGING |
| S3 | COMMEMORATION | PERSONS IN FRONT OF SPECIFIC STRUCTURE | YES (MIDDLE OR SMALL) | NO COLOR FOGGING |
| S4 | LANDSCAPE | NO PERSON AND FAR LANDSCAPE | NO | NO SPECIFIC COLOR FOGGING |
| S5 | TWILIGHT VIEW | ROSY TWILIGHT SCENE AND PERSONS THEREIN | - | PARTIALLY ROSY |
| S6 | NIGHT VIEW | LIGHT SOURCES OR ILLUMINATED STRUCTURE IN THE DARK | NO | DARK AND BRIGHT |
| S7 | NIGHT PORTRAIT | PORTRAIT IN THE DARK | YES (MIDDLE OR LARGE) | DARK AND BRIGHT |
| S8 | OCEAN VIEW | SCENE ON THE BEACH WITH LARGE LUMINANCE VARIATION | - | PARTIALLY BLUISH |
| S9 | FLUORESCENT LAMP | ROOM SCENE UNDER ILLUMINATION OF FLUORESCENT LAMP | - | BLUE-GREENISH |
| S10 | TUNGSTEN LAMP | SCENE UNDER ILLUMINATION OF TUNGSTEN LAMP | - | ROSY |

FIG. 23

TABLE 2

| SCENES | | COMPENSATION PROCESSES | | | |
|---|---|---|---|---|---|
| | | CONTENTS | COLOR BALANCING | γ (CONTRAST) | EDGE EMPHASIZING |
| S1 | SNAPSHOT | NORMAL PROCESS | NORMAL WHITE BALANCING | 1.2 | MIDDLE |
| S2 | PORTRAIT | BIASED WHITE BALANCING LOW CONTRAST WEAK EDGE EMPHASIZING | BIASED WHITE BALANCING | 1.1 | WEAK |
| S3 | COMMEMORATION | BIASED WHITE BALANCING MIDDLE EDGE EMPHASIZING | BIASED WHITE BALANCING | 1.2 | MIDDLE |
| S4 | LANDSCAPE | NO COLOR BALANCING HIGH CONTRAST | NO WHITE BALANCING | 1.3 | STRONG |
| S5 | TWILIGHT VIEW | NO COLOR BALANCING MIDDLE EDGE EMPHASIZING | NO WHITE BALANCING | 1.2 | MIDDLE |
| S6 | NIGHT VIEW | WEAK COLOR BALANCING | WEAK WHITE BALANCING | 1.15 | MIDDLE |
| S7 | NIGHT PORTRAIT | PROPER EXPOSURE OF FACE    WEAK COLOR BALANCING | WEAK WHITE BALANCING | 1.15 | MIDDLE |
| S8 | OCEAN VIEW | NO COLOR BALANCING HIGH CONTRAST | NO WHITE BALANCING | 1.3 | STRONG |
| S9 | FLUORESCENT LAMP | COMPENSATION OF COLOR FOGGING DUE TO FLUORESCENT LAMP | NORMAL WHITE BALANCING | 1.2 | MIDDLE |
| S10 | TUNGSTEN LAMP | WEAK COMPENSATION OF COLOR FOGGING DUE TO TUNGSTEN LAMP | WEAK WHITE BALANCING | 1.2 | MIDDLE | ns # IMAGING APPARATUS

This application is based on patent applications 2001-014301 and 2001-014302 filed in Japan, the contents of which are hereby incorporated by references.

BACKGROUND OF THE INVENTION

1. Field of the Invention

This invention relates to an imaging apparatus having functions for judging a condition with respect to an object and for compensating an image data of the object by basing on the result of the judgment.

2. Description of the Related Art

In a field of a digital still camera using an imaging device such as a CCD or a CMOS, a first conventional camera enabling image taking, image reproducing and image printing processes with attaching importance to a main object selected by a user is conventionally proposed, for example, in Publication Gazette of Japanese Patent Application Hei 11-136568.

The conventional camera has a display panel by which a position or an area of a main object on the display panel can be selected before taking an image of the object. When the image of the object is reproduced or printed, the image data of the image are compensated in a manner so that brightness, colors and so on of the area corresponding to the main object become proper by using a position information of the selected area.

The conventional camera, however, merely memorizes the position information of the selected area as the main object, but contents of the image data compensation are not memorized.

In a conventional printer shown in the above-mentioned publication gazette, it is judged whether the main object is a person or not by retrieving a color of human skin in the selected area or in the vicinity of the selected position. Thus, it is necessary to wait a long time for printing an image of the object. For selecting a plurality of persons, it is necessary to repeat substantially the same processes in the same number as the persons. Thus, the processes for selecting the main objects becomes troublesome, and the operative performance of the camera becomes lower.

On the other hand, another digital still camera (second conventional camera) is proposed, for example, in Publication Gazette of Japanese Patent Application Hei 11-298768. When a shutter switch is pushed by a predetermined middle depth, the camera outputs an image data taken by an imaging device in a monitoring mode at a predetermined interval. When the shutter switch is fully pushed, the camera outputs the image data in a full image data outputting mode so as to be recorded in a recording media.

In the monitoring mode, a plurality of pixel data from pixels adjoining each other are added, so that a number of pixel data included in the image data used for displaying a monitor image on a monitor display is reduced. Thus, it is possible to shorten the image data processing for displaying the monitor image. When the pixel data are simply added, the level of the added pixel data becomes higher, so that the level of the added pixel data must be reduced corresponding to the number of added pixel data with respect to one pixel of the monitor image. As a result, it is possible to execute the calculation of control values for compensating exposure value and color balances commonly in both of the monitoring mode and the full image data outputting mode.

In the second conventional camera, the control values are merely used in the monitoring mode and the full image data outputting mode, commonly. It, however, is desired in an imaging apparatus to judge a condition of an object or to execute a compensation process to an image data outputted from an imaging device by basing on a result of a judgment. Furthermore, it is preferable to execute the judgment and the compensation process by following proper steps with respect to the monitoring mode and the full image data outputting mode.

SUMMARY OF THE INVENTION

A purpose of this invention is to provide an imaging apparatus by which information with respect to judgment of an image including a condition of an object and/or information with respect to compensation process of an image data can be recorded, and a proper compensation process can be executed to the image data when the image is outputted.

Another purpose of this invention is to provide an image outputting apparatus by which an image compensation process is properly executed using the information with respect to the judgment of the image and/or the compensation process recorded by the above-mentioned imaging apparatus.

Still another purpose of this invention is to provide an image processing system including the above-mentioned imaging apparatus and the image outputting apparatus.

Still another purpose of this invention is to provide an imaging apparatus by which judgment of a condition of an object can properly executed in respective monitoring mode and the full image data outputting mode.

Still another purpose of this invention is to provide an imaging apparatus by which a compensation process can properly be executed to an image data in respective monitoring mode and the full image data outputting mode.

An imaging apparatus in accordance with an aspect of the present invention comprises: an imaging device for taking an image of an object and for outputting an image data of the object; a condition judger for judging conditions of the object using the image data outputted from the imaging device; an image data compensator for compensating the image data corresponding to the result of judgment by the condition judger; a compensation information selector for selecting information with respect to compensation processes executed by the image data compensator; a recording data former for forming recording data by adding the selected information to the compensated image data; and a recorder for recording the recording data into a recording medium.

By such a configuration, the image data outputted from the imaging device can be properly compensated corresponding to the result of judgment of the scene. For example, when the scene is judged as portrait, the image data is compensated in a manner so that the face portion can be reproduced natural and soft.

Another imaging apparatus in accordance with an aspect of the present invention comprises: an imaging device for taking an image of an object and for outputting an image data of the object; a condition judger for judging conditions with respect to the object by using the image data outputted from the imaging device; an image data compensator for compensating the image data corresponding to the result of judgment by the condition judger; an image judgment information selector for selecting information with respect to result of judgment of conditions with respect to the object by the condition judger; a recording data former for forming recording data by adding the selected information with respect to the result of judgment to the compensated image data; and a recorder for recording the recording data into a recording medium.

By such a configuration, the image data outputted from the imaging device can be properly compensated corresponding to the result of judgment of the condition of the object. For example, when it is judged that color fogging occurs, the image data is compensated so as to reduce the affect of the color fogging.

An image outputting apparatus in accordance with an aspect of the present invention comprises: a data input device for taking recording data including image data of an image and information with respect to the image from external equipment; an image data output compensator for compensating the image data using the information with respect to the image included in the recording data; an image outputting mechanism for outputting an image; and an image output controller for controlling the image outputting mechanism so as to output an image by using the compensated image data. The image output compensator executes compensation processes to the image data corresponding to output characteristics of the image outputting mechanism.

By such a configuration, the information with respect to the image from the external equipment such as a digital still camera by which the image data is taken can be used for compensating the image data in the image outputting apparatus. Thus, the image reproduced by the image outputting apparatus properly reproduces the original object.

An image processing system in accordance with an aspect of the present invention is configured by one of the above-mentioned imaging apparatuses and one of the above-mentioned image outputting apparatuses.

By such a system, the information corresponding to the scene or the condition of the object judged in the imaging apparatus can be used for reproducing the image by the image outputting apparatus. Thus, the image data can properly be compensated corresponding to the judgment of the scene or the condition of the object in the image outputting apparatus.

A still another imaging apparatus in accordance with an aspect of the present invention comprises: an imaging device including a plurality of photo-electro transfer elements which are two-dimensionally arranged and outputting an image data of an object by taking an image of the object; an operation member which can be operated from outside of the imaging apparatus; a display device for displaying an image; an operation controller selecting a preparation state, which is a stage prior to an image taking operation, corresponding to a first operation of the operation member, and executing the image taking operation for recording image data of an object corresponding to a second operation of the operation member; a first judger for judging a condition with respect to the object using first image outputted from the imaging device in the preparation state; a second judger for judging a condition with respect to the object using second image data output from the imaging device when the second operation is executed by the operation member; a first image data compensator for executing a first compensation process to the first image data corresponding to result of judgment by the first judger; a second image data compensator for executing a second compensation process to the second image data corresponding to result of judgment by the second judger; a display controller for displaying the image of the object using the first image data to which the first compensation process is executed in the preparation state; and a recording controller for recording the second image data to which the second compensation process is executed when the image taking operation is executed.

By such a configuration, the first image data used for displaying the monitor image serving as the viewfinder can quickly be compensated, and the second image data to be recorded in the recoding medium can properly be compensated by a different compensation process from that for the first image data.

BRIEF DESCRIPTION OF THE DRAWINGS

FIGS. 15A to 15C are drawings for showing arrangements of filters which are used for emphasizing edges of the object in the embodiment;

FIG. 17 is a graph for schematically showing an example of a recording image data to be recorded in a recording medium in the embodiment;

FIG. 22 is a table 1 for showing relations between classified scenes and items for judging the scene in the embodiment; and FIG. 23 is a table 2 for showing relations between the classified scenes and contents of the compensation processes in the embodiment.

DETAILED DESCRIPTION OF THE EMBODIMENT

Figure 1:
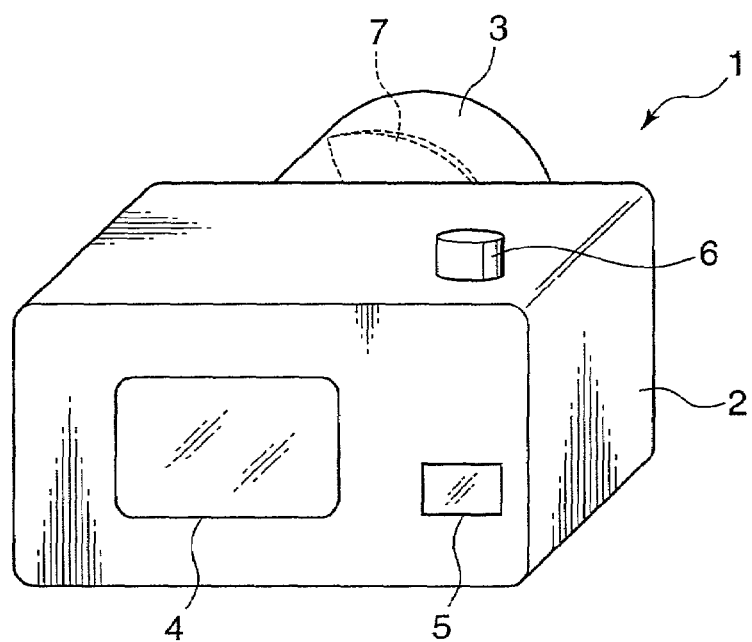
FIG. 1 is a perspective view for showing an appearance of a digital still camera which is an example of an imaging apparatus in an embodiment of the present invention.
Figure 2:
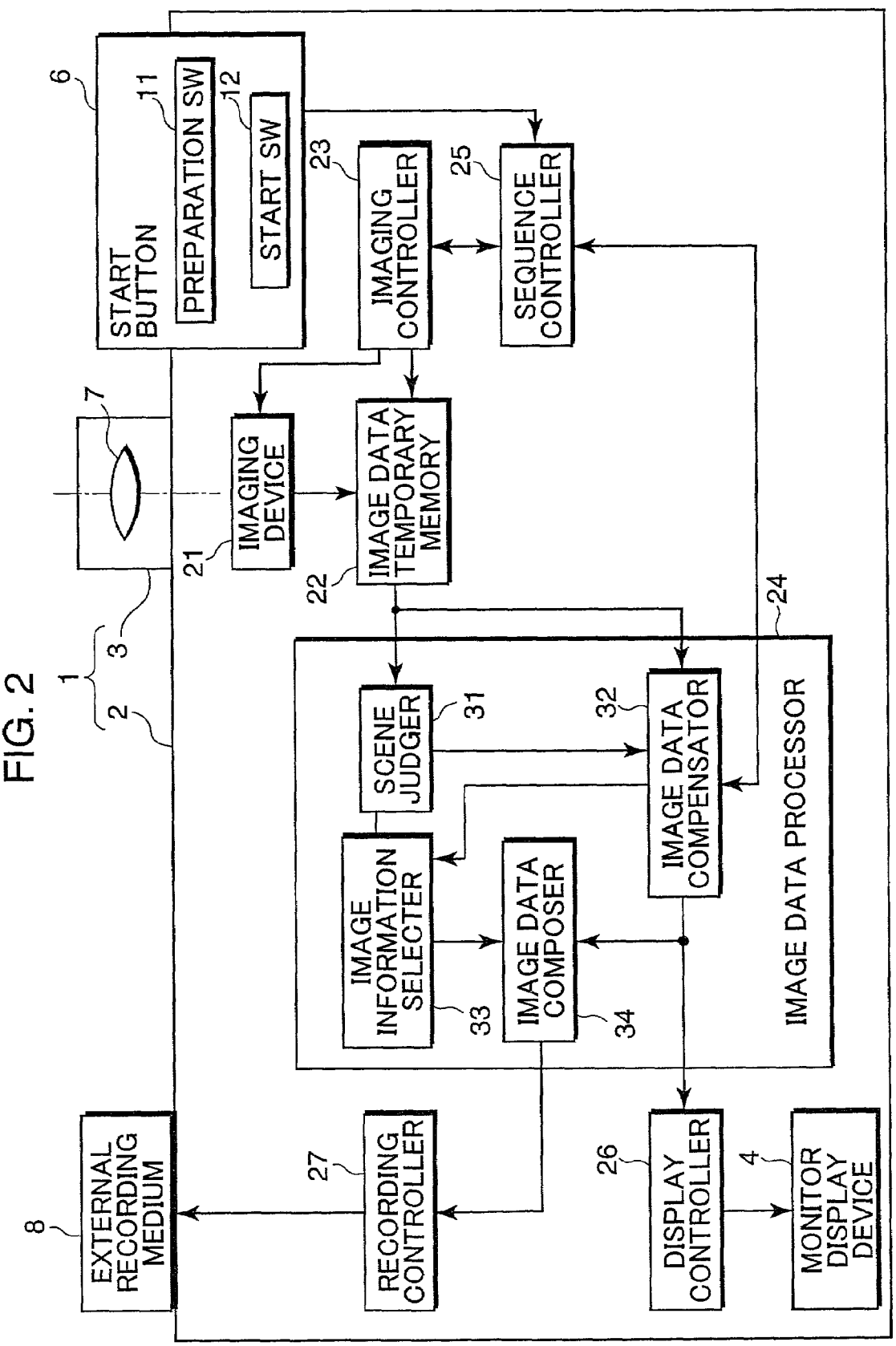
FIG. 2 is a block diagram for showing a configuration of the digital still camera in the embodiment.

An embodiment of this invention is described with reference to the figures. FIG. 1 is a perspective view of a digital still camera which is an example of an imaging apparatus in accordance with this embodiment. FIG. 2 is a block diagram of the digital still camera in this embodiment.

As can be seen from FIG. 1, the digital still camera 1 comprises a camera body 2 and a taking lens 3. A monitor display device 4 including an LCD (Liquid Crystal Display) and a memory recorder 5 to which an external recording medium 8 (see FIG. 2) such as a memory card can be inserted to be recorded are provided on a rear face of the camera body 2. A shutter start button 6 (hereinafter, it is called "start button 6) is provided at a right side on a top face of the camera body 2. An optical lens system 7 is provided in the inside of a lens barrel of the taking lens 3.

The digital still camera 1 has functions for taking an image data of an object, for executing compensation processes such as a color balancing and a contrast compensation and for recording the compensated image data into the external recording medium 8.

With respect to the compensation process of the image data, a normal compensation process is executed in view of several kinds of image outputting apparatuses such as a CRT (Cathode Ray Tube), an LCD, a printer, and so on.

As shown in FIG. 2, the start button 6 includes a preparation switch 11 and a start switch 12. In the figures, the term "switch" is abbreviated as "SW". The preparation switch 11 is switched on when the start button 6 is pushed midway to a predetermined depth. When the preparation switch 11 is switched on, the digital still camera 1 takes preparation state (or monitoring mode) ready for taking an image data. The start switch 12 is switched on when the start button 6 is fully pushed down. When the start switch 12 is switched on, the digital still camera 1 takes image taking state (or full image data outputting mode) for taking an image of an object to be recorded.

The monitor display device 4 serves as an electronic viewfinder for displaying an image of the object using an image data taken by an imaging device 21 (see FIG. 2) when the digital still camera 1 takes the preparation state. After memorizing the image data in the external recording medium 8, the monitor display device 4 displays the image of the object on the LCD by using the recorded image data.

As shown in FIG. 2, the taking lens 3 has functions for moving the position of the optical lens system 7 so as to focus the image of the object on a light receiving surface of a color area sensor such as CCD (Charge Coupled Device) of an imaging device 21 and to vary a focal length of the optical lens system 7 (zooming function). The external recording medium 8 is a detachable memory such as a conventional card type memory including a flash memory or EEPROM, a floppy disc (FD), and so on.

Further to the color area sensor, the imaging device 21 comprises an analog signal processing circuit and an A/D converter for outputting the image data of the object. The color area sensor is configured so that a plurality of photo-electro converting devices are two-dimensionally arranged and color filters of R(red), G(green) and B(blue) are correspondingly disposed in front of the photo-electro converting devices. A color image data of an image of an object is outputted from the imaging device 21, and it is temporarily memorized in an image data temporary memory 22. For the color area sensor of the imaging device 21, it is possible to use a CCD, a CMOS, or the like.

An imaging controller 23 decides an exposing time and a gain in the imaging device 21 which will be used for taking a next image data by basing on information memorized in the image data temporary memory 22, and further selects a mode for outputting an image data from the imaging device 21.

An image data processor 24 includes a scene judger 31, an image data compensator 32, an image information selector 33 and an image data composer 34, so as to execute the following functions.

The image data processor 24 executes predetermined processes to the image data outputted from the imaging device 21, and judges a condition with respect to the object including the scene. Hereupon, the predetermined process such as a thinning ratio is executed so that the image data in the preparation state is different to that in the image taking state.

The image data processor 24 further executes the compensation process to the image data in a manner so that an image which will be reproduced becomes proper with respect to the condition of the object judged by the above-mentioned function.

The scene judger 31 of the image data processor 24 divides the image data into a plurality of areas, and judges color fogging condition with respect to each area of the image data. The scene judger 31 further judges whether or not at least a part of a person is included in the image. Subsequently, the scene judger 31 forms a color histogram with respect to each area of the image data, and judges a main object and the scene of the image based on the information of the color histograms and the information whether or not the part of the person is included in the image.

The image data compensator 32 executes the compensation processes with respect to several characteristics of the image data corresponding to the result of the judgment by the scene judger 31 such as the condition of color fogging, kind of the main object, kind of the scene of the image, and so on. The characteristics of the image data includes, for example, an exposure value, color balances, γ characteristics, edge emphasizing, and so on.

The image information selector 33 selects information with respect to the scene of the image, the information of the image data compensation such as the compensation values of the image data and so on as the image information. The image data composer 34 forms recording data to be recorded in the external recording medium 8 by composing the compensated image data by the image data compensator 32 and the image information set by the image information selector 33.

A sequence controller 25 controls imaging sequences for taking the image, for outputting the image data, and so on. For example, when the preparation switch 11 is turned on, the sequence controller 25 shifts the state of the digital still camera 1 to the preparation state. Alternatively, when the start switch 12 is turned on, the sequence controller 25 starts the image taking operation, and subsequently starts the operation of the image data compensator 32 corresponding to a signal showing the image taking operation had been completed.

A display controller 26 displays the image of the object on the monitor display device 4 by using the compensated image data. In the preparation state, the display controller 26 displays the image which is quickly compensated at real time. When the image taking operation is started, the display controller 26 displays the image to be recorded on the monitor display device 4. A recording controller 27 records the recording data formed by the image data composer 34 in the external recording medium 8.

In the above-mentioned elements 21 to 27 are respectively configured by one or a plurality of CPU, EEPROM, RAM, ROM and several kinds of electronic circuits. Details of the elements 21 to 27 will be described below.

Figure 3:
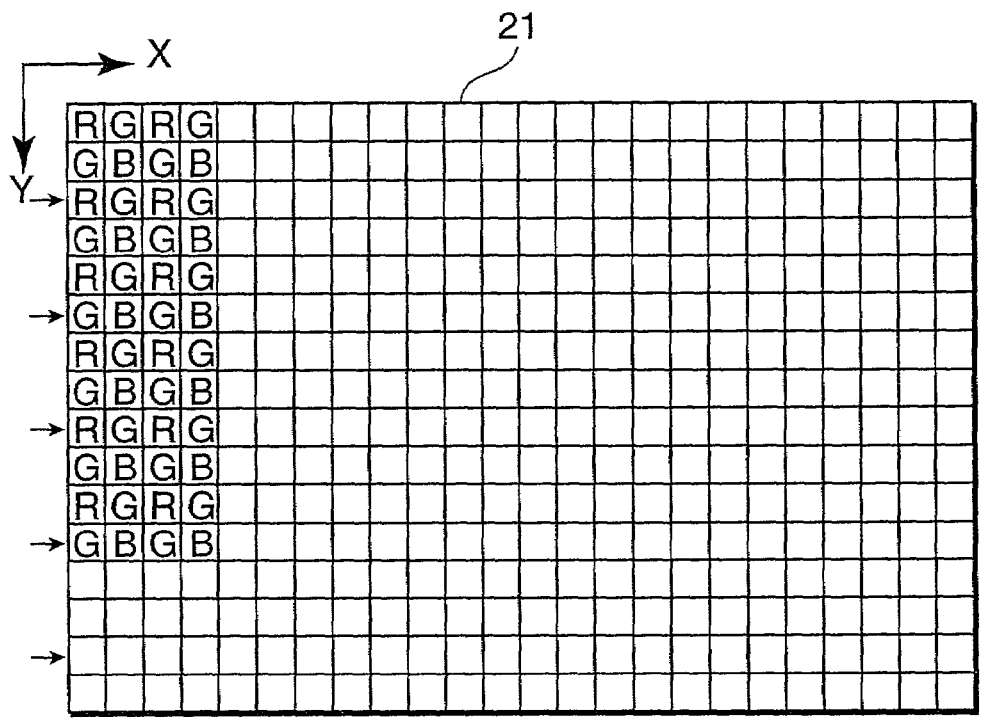
FIG. 3 is a drawing for showing an example of an arrangement of color filters or pixels of an area sensor of an imaging device used in the digital still camera in the embodiment.
Figure 4:
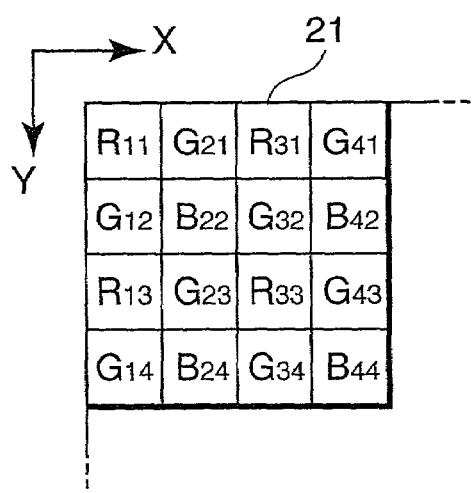
FIG. 4 is a drawing for showing an example of numbering of the pixels in the imaging device in the embodiment.

The image data outputted from the imaging device 21 is described with reference to FIGS. 3 and 4. FIG. 3 shows an example of an arrangement of the color filters or the pixels of the area sensor of the imaging device 21. FIG. 4 shows an example of the numbering of the pixels.

As mentioned above, the area sensor of the imaging device 21 has a full pixel data outputting mode and a pixel data thinning mode as image outputting modes. When the full pixel data outputting mode is selected, the imaging device 21 outputs all the pixel data. Alternatively, when the image data thinning mode is selected, the imaging device 21 thins out the pixel data by a predetermined pitch of the pixels in the direction designated by arrow Y (Y-direction), and outputs the thinned pixel data. In the direction designated by arrow X (X-direction), the pixel data are not thinned out. For example, when the pitch of the thinning out of the pixels is selected to be three pixels, the pixel data on the lined designated by arrows in FIG. 3 are outputted.

In the pixel data thinning mode, the image data processor 24 executes the thinning process for thinning the pixel data in the X-direction at the same pitch in the Y-direction, and executes other processes to the thinned pixel data. By such the thinning processes, the aspect ratio of the thinned image becomes the same as that of the original image. In summary, the pixel data in the Y-direction is thinned out while the image data is outputted from the area sensor, and the pixel data in the X-direction is thinned out while the image data is processed.

In the color area sensor, one color filter corresponding to one of the principal colors of R, G and B is disposed in front of each pixel, as shown in FIG. 3, so that only a color data with respect to a specific one principal color can be obtained from a specific pixel. Other color data with respect to other two principal colors are obtained by the interpolation process using the color data outputted from the adjoining pixels of the specific pixel.

A pixel designated by symbol "$B_{22}$" (hereupon, abbreviated as "pixel $B_{22}$") is considered. A color data $B_{22}$ with respect to the principal color of blue is outputted from the pixel $B_{22}$. Other color data $R_{22}$ and $G_{22}$ with respect to the principal colors of red and green of the pixel $B_{22}$ are interpolated by the following equations.

$$R_{22}=(R_{11}+R_{31}+R_{13}+R_{33})/4$$

$$G_{22}=(G_{21}+G_{12}+G_{32}+G_{23})/4$$

Symbols $R_{11}$, $R_{31}$, $R_{13}$ and $R_{33}$ are respectively color data of red outputted from the pixels designated by symbols $R_{11}$, $R_{31}$, $R_{13}$ and $R_{33}$. Symbols $G_{21}$, $G_{12}$, $G_{32}$ and $G_{23}$ are respectively color data of green outputted from the pixels designated by symbols $G_{21}$, $G_{12}$, $G_{32}$ and $G_{23}$. By such the interpolation using four color data outputted from adjoining four pixels of the specific pixel, all the color data with respect to each pixel can be obtained.

Figure 5:
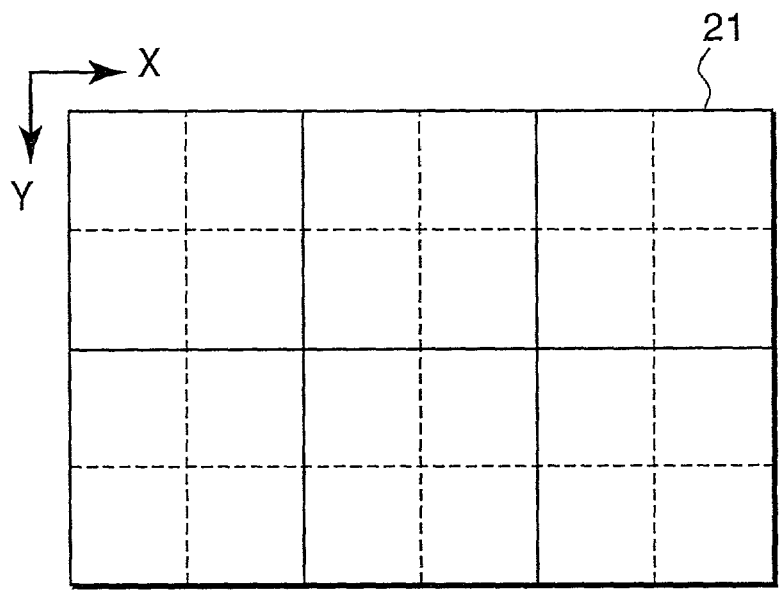
FIG. 5 is a drawing for showing an example of division of the pixels on the area sensor of the imaging device in the embodiment.
Figure 6:
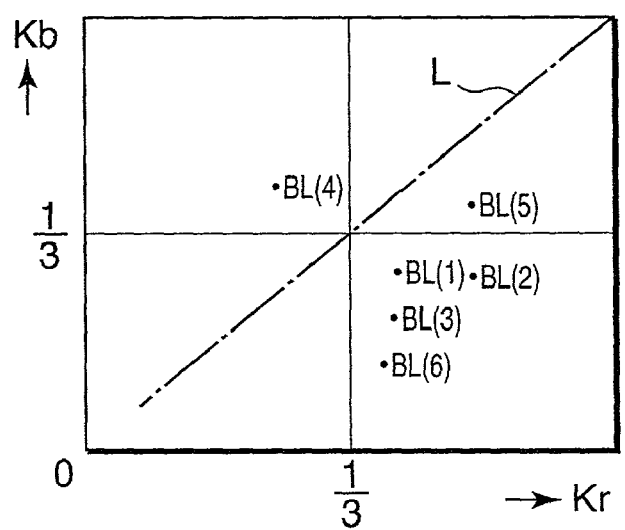
FIG. 6 is a graph used for judging the occurrence of color fogging in the embodiment.

Judgment of occurrence of the color fogging is described with reference to FIGS. 5 and 6. FIG. 5 shows an example of division of the pixels on the area sensor of the imaging device 21. FIG. 6 shows an example of a graph used for judging the occurrence of the color fogging.

In the judgment of the occurrence of the color fogging, whole the pixels of the area sensor of the imaging device 21 are divided into a plurality of areas, and the judgment is executed with respect to each area. When the color fogging occurs in every areas, it is judged as the color fogging due to the light source. When the color fogging occurs only in some areas, it is judged as biasing of specific colors. Thus, it is possible to distinguish the biasing of the specific colors from the color fogging due to the light source, and it is possible to compensate the color data only when the color fogging due to the light source occurs.

In the preparation state, the pixels of the area sensor is divided into six areas by dividing into three portions in the X-direction and into two portions in the Y-direction, as shown by solid line in FIG. 5. In the image taking state, the pixels of the area sensor is divided into twenty four areas by dividing into six portions in the X-direction and into four portions in the Y-direction, as shown by dotted line in FIG. 5.

In the preparation state, it is demanded to display the image on the monitor display device 4 in real time, so that the pixels of the area sensor are roughly divided for processing the pixel data as quickly as possible.

In this embodiment, averaged values of each color data in the pixel data are used for judging the occurrence of the color fogging. By using the averaged values, when the color fogging has not occurred, the following equations (1) and (2) are established.

$$Kr(n)=Rave(n)/\{Rave(n)+Gave(n)+Bave(n)\}=\tfrac{1}{3} \qquad (1)$$

$$Kb(n)=Bave(n)/\{Rave(n)+Gave(n)+Bave(n)\}=\tfrac{1}{3} \qquad (2)$$

Hereupon, Rave(n), Gave(n) and Bave(n) respectively show the averaged values of the color data with respect to R, G and B in each area. Symbol "n" designates the number of the areas, so that "n" becomes 1 to 6 in the preparation state, and "n" becomes 1 to 24 in the image taking state.

The sensitivities of the pixels corresponding to the principal colors of red, green and blue are compensated to be substantially the same by the analog signal processing circuit in the imaging device 21. When an image of a test chart colored by white or gray is taken by the imaging device 21, the values Kr(n) and Kb(n) following to the above-mentioned equations (1) and (2) are outputted from the imaging device 21.

The values Kr(n) and Kb(n) are used for showing the coordinate of each area on the graph shown in FIG. 6.

$$BL(n)=(Kr(n), Kb(n)) \qquad (3)$$

The points BL(n) of the areas are plotted on the two-dimensional coordinates of the graph shown in FIG. 6. The abscissa of the graph shows the value Kr and the ordinate shows the value Kb. The occurrence of the color fogging is judged by the bias of the plotted points.

In the example shown in FIG. 6, the plotted points are largely observed in the right side of a boundary "L" in the graph, so that it is judged that the color fogging of red has occurred. When the plotted points are largely observed in the left side of the boundary "L", it is judged that the color fogging of blue has occurred. When the plotted points are dispersedly observed in both sides of the boundary "L", it is judged that the color fogging has not occurred.

A compensation value for compensating the color fogging is calculated corresponding to the coordinates of the center of gravity of the plotted points in the same side of the boundary "L". In the example shown in FIG. 6, the compensation value is calculated corresponding to the coordinates of the center of gravity of the points BL(1), BL(2), BL(3), BL(5) and BL(6).

When the coordinates (Kr, Kb) of the center of gravity of the plotted points shown by the following equation (4), the compensation factors Δr, Δg and Δb are shown by the equations (5) to (7).

$$(Kr, Kb)=(0.5, 0.2) \quad (4)$$

$$\Delta r=0.3/0.5=0.6 \quad (5)$$

$$\Delta g=1 \quad (6)$$

$$\Delta b=0.3/0.2=1.5 \quad (7)$$

In this example, the occurrence of the color fogging is judged with respect to red and blue which are respectively disposed at both ends of the color spectrum, so that the compensation factor Δg of green is selected to be "1" as shown by the equation (6). Furthermore, the value ⅓ is approximated as 0.3 in the equations (5) and (7). When it is judged that the color fogging has not occurred, the compensation factors are selected to be Δr=1, Δg=1 and Δb=1.

As mentioned above, the pixel data outputted from the imaging device 21 is divided into a plurality of areas, averaged color value of the pixel data included in each area is calculated, and the occurrence of the color fogging is judged by using the averaged color values. When the color fogging due to the light source has occurred, the color fogging due to the light source is compensated, so that it is possible to retrieve a predetermined color characterizing a specific object such as a person from the background.

Figure 7:
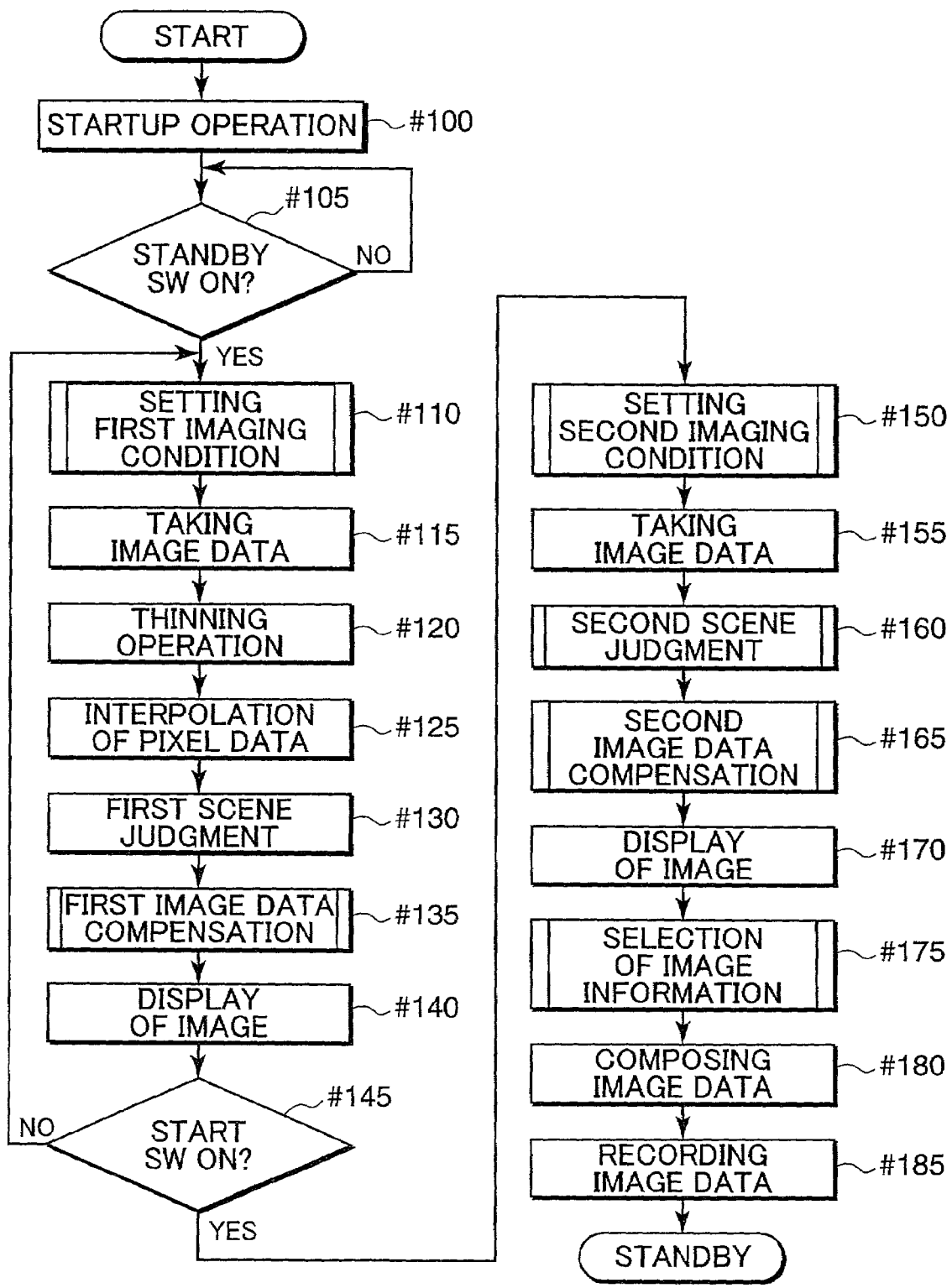
FIG. 7 is a flowchart for showing a main routine of operations of the digital still camera in the embodiment.

Subsequently, operations of the digital still camera 1 in this embodiment is described with reference to flowcharts. FIG. 7 shows a main routine of the operations of the digital still camera 1.

When an electric power switch of the camera 1 is switched on, the startup operation of the camera 1 such as the initialization of the area sensor of the imaging device 21, the contents of the display on the monitor display device 4, the position of the optical lens system 7, and so on are executed (#100). The sequence controller 25 waits the preparation switch 11 being switched on (#105).

When the preparation switch 11 is switched on (YES in step #105), the camera 1 takes the preparation state (or monitoring mode), and the sequence controller 25 executes a first imaging condition setting subroutine (#110).

Figure 8:
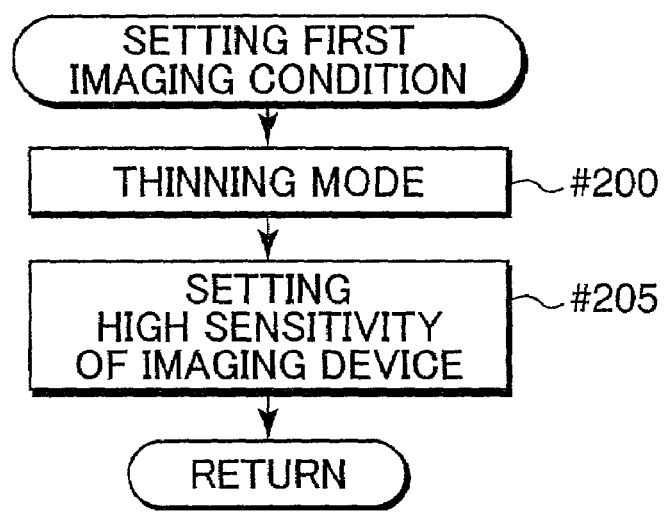
FIG. 8 is a flowchart for showing a first imaging condition setting subroutine in step #110 in the main routine.

FIG. 8 is a flowchart of the first imaging condition setting subroutine in step #110. When the first imaging condition setting operation starts, the image outputting mode of the imaging device 21 is selected to be the thinning mode (#200). Subsequently, the gain (sensitivity) of the area sensor of the imaging device 21 is selected to be higher, for example, eight times (#205).

In the preparation state, it is required to process the image data quickly for displaying the image on the monitor display device 4 at real time. By setting the thinning mode, the time necessary for reading the pixel data from the area sensor can be shortened. By setting the gain of the area sensor higher, it is possible to shorten the exposing time of the area sensor. Thus, the quick image data processing can be realized.

When the first imaging condition setting subroutine is completed, the imaging controller 23 controls the imaging device 21 for taking an image of an object to be displayed on the monitor display device 4. The image data taken by the imaging device 21 is temporarily memorized in the image data temporary memory 22 (#115).

When the image data is taken, the thinning operation of the pixel data constituting the image data is executed (#120). As mentioned above, the pixel data in the Y-direction are thinned out while the pixel data are outputted from the area sensor of the imaging device 21. The pixel data in the X-direction are thinned out in step #120. Subsequently, the color data of R, G and B with respect to each pixel are formed by interpolation of the pixel data (#125).

When the color data are interpolated, the scene judger 31 executes a first scene judging subroutine for judging the scene of the image in the preparation state (#130).

Figure 9:
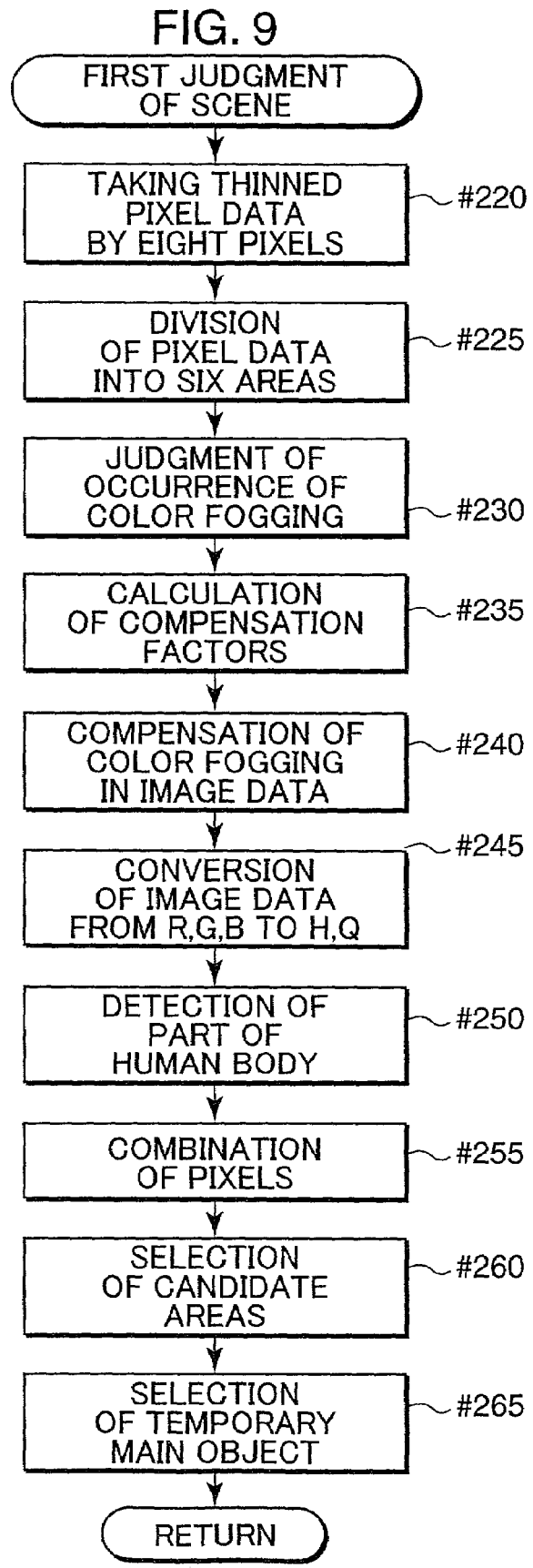
FIG. 9 is a flowchart for showing a first scene judging subroutine in step #130 in the main routine.

FIG. 9 is a flowchart of the first scene judging subroutine in step #130. When the first scene judging subroutine starts, the image data is thinned out by a predetermined number (for example, eight) of the pixels, and the thinned pixel data are taken (#220). In this embodiment, the pixel data are already thinned out at the pitch of three pixels, so that the pixel data thinned out at a pitch of 24 pixels from the image data taken by the imaging device 21 is used in the first scene judgment.

Subsequently, the thinned pixel data are further divided into a plurality of areas, for example, six areas divided by three portions in the X-direction and two portions in the Y-direction (#225). The occurrence of the color fogging is judged with respect to each area by calculating the values Kr(n) and Kb(n) by following the above-mentioned equations (1) to (3) (#230). Furthermore, the compensation factors Δr, Δg and Δb are calculated (#235).

The image data are compensated for canceling the affect due to the color fogging by using the compensation factors Δr, Δg and Δb (#240). In the following equations, symbols R', G' and B' designate the original image data, and symbols R, G and B designate the compensated image data.

$$R=\Delta r \cdot R' \quad (8)$$

$$G=\Delta g \cdot G' \quad (9)$$

$$B=\Delta b \cdot B' \quad (10)$$

When the image data are compensated, the image data based on the R, G and B color signals are converted to other image data based on hue (H) and compensated chroma (Q) by following the equations (11) and (12) (#245). The compensated chroma (Q) takes a value between 0° to 360° (0°≦Q≦360°), and the hue (H) takes a value between 0 to the largest value among the values of R, G and B.

$$H=\cos^{-1}[\{(R-G)+(R-B)\}/2 \cdot 1/\sqrt{\{(R-G)^2+(R-B)\cdot(G-B)}\}] \quad (11)$$

$$Q=\sqrt{[\{(2R-G-B)/2\}^2+\{\sqrt{(3)}(G-B)/2\}^2]} \quad (12)$$

Since the hue (H) may not be affected by variation of luminance, it is effective for retrieving an object in which the luminance of the object will be predicted. Since the compensated chroma (Q) has a characteristic that the saturation increases in proportion to lightness, i.e. value, it is preferable for detecting human skin having relatively high lightness. It can emphasize the human skin much more than the chroma obtained from the Munsell color system.

There are several variations in the color of human skin. However, when the ranges of the values of the hue (H) and the compensated chroma (Q) are selected to be the following formulae, all the colors of human skin are substantially included in these ranges. Thus, it is possible to judge whether at least a part of a person (or human body) is included in the image or not by comparing the values H and Q with respect to each area with these ranges (#250).

$$0 \leq H \leq 0.4 \tag{13}$$

$$50° \leq Q \leq 120° \tag{14}$$

Subsequently, the continuity of the pixels showing the possibility of a part of human body is judged. When a plurality of pixels which can be regarded as the part of human body are continuously found, these pixels are combined as the same portion of the object (#255). Concretely, the pixels having the values of the hue (H) and the compensated chroma (Q) included in the above-mentioned ranges on the same line in the X-direction are judged continuous or not. When the pixels are judged continuous, the portion corresponding to these pixels are regarded as the same portion of the same object.

When a predetermined number of pixels in another predetermined number of adjoining pixels are judged continuous but a few number of, for example, one pixel(s) in the adjoining pixels is(are) not judged continuous, the whole the adjoining pixels including the pixel(s) judged discontinuous can be regarded as continuous.

Subsequently, the size and the shape of the area formed by the continuous pixels in the X-direction and in the Y-direction are judged for selecting candidate areas of a main portion of the object (#260). When the candidate areas are selected, one of the candidate areas is further selected as a temporary main object corresponding to the size, the shape and the distribution of the continuous pixels (#265).

For example, when a plurality of candidate areas are arranged in the X-direction, it is possible to regard that a plurality of persons stand side by side. In such the case, it is possible to select a plurality of main objects. When three candidate areas are arranged vertically as an oblong isosceles triangle, they can be regarded as face and both hands of the same person. In such a case, it is possible to select the upper area as a main object.

When the first scene judging subroutine is completed, a first image data compensation subroutine is executed so as to display the temporary main object on the monitor display device 4 (#135 in FIG. 7).

Figure 10:
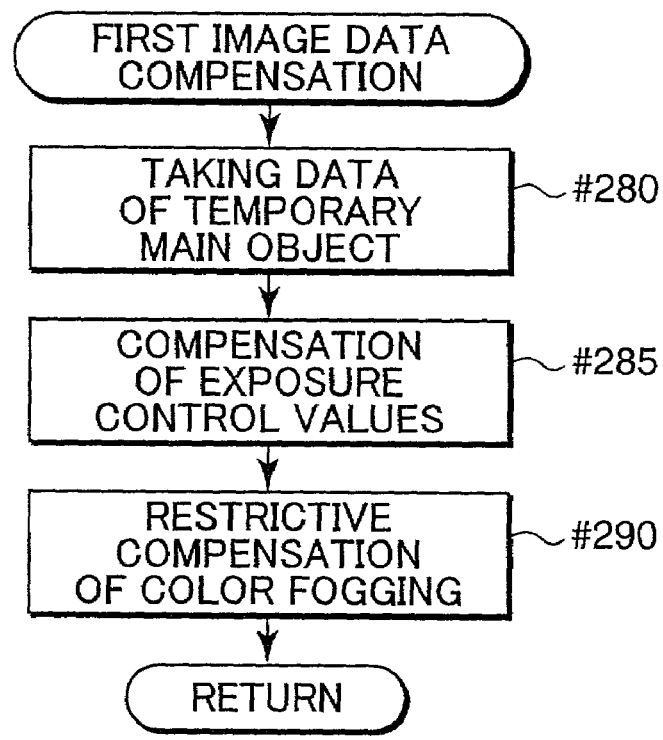
FIG. 10 is a flowchart for showing a first image data compensation subroutine in step #135 in the main routine.

FIG. 10 is a flowchart of the first image data compensation subroutine in step #135. When the first image data compensation subroutine starts, data with respect to the position of the temporary main object, and so on are taken (#280), and the exposure control values of the temporary main object are compensated (#285). Subsequently, the image data are restrictively compensated so as to reduce the affect of the color fogging (#290).

For example, when the image with respect to twilight is completely compensated for canceling the affect of the color fogging, it becomes unnatural. Thus, the image data are restrictively compensated. Concretely, when the compensation factors $\Delta r$, $\Delta g$ and $\Delta b$ are selected to be a value near to "1", for example, "0.7" when the calculated value of the compensation factors are smaller than "0.7".

When the compensation factors $\Delta r$ and $\Delta b$ are larger than "1.1", it is possible to multiply the compensation factors by a predetermined factor, e.g. $\alpha$=0.95. When the compensation factors $\Delta r$ and $\Delta b$ are smaller than "0.9", it is possible to divide the compensation factors by the predetermined factor $\alpha$.

When the first image data compensation subroutine in step #135 is completed, the image is displayed on the monitor display device 4 by using the compensated image data (#140). The above-mentioned steps #110 to #140 are repeated until the start switch 12 is switched on (#145).

In the above-mentioned preparation state, the main object is decided temporarily, and the image data are compensated so as to make the temporary main object be proper. Thus, the monitor display device 4 serving as the electronic viewfinder can display the proper image.

The start switch 12 is switched on in the preparation state (YES in step #145), the camera 1 takes the image taking state (or full image data outputting mode), and the sequence controller 25 executes a second imaging condition setting subroutine (#150).

Figure 11:
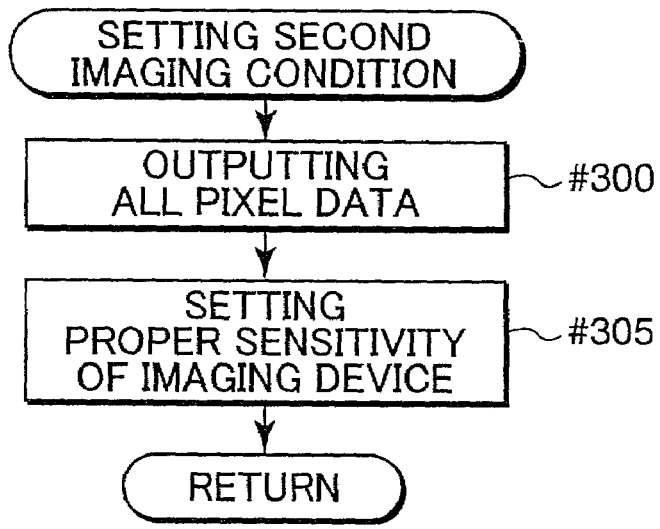
FIG. 11 is a flowchart for showing a second imaging condition setting subroutine in step #150 in the main routine.

FIG. 11 is a flowchart of the second imaging condition setting subroutine in step #150. When the second imaging condition setting operation starts, the image outputting mode of the imaging device 21 is selected to be the full image data outputting mode (#300). Subsequently, the gain (sensitivity) of the area sensor of the imaging device 21 is selected to be the most proper level (#305).

The most proper level of the gain of the area sensor is selected by the imaging controller 23 corresponding to the light receiving level of the area sensor in the preparation state. Concretely, when the output signal (pixel data) from each photo-electric transfer device in the area sensor is amplified by the gain in the most proper level, the highest output signal may not be overflowed.

Since the image taking is executed only when the start switch 12 is switched on, the number of image taking operations of the imaging device 21 in the image taking state is much smaller than that in the preparation state. Furthermore, the image data taken in the image taking state is to be recorded. Thus, precision is required in the image taking state rather than quickness. By outputting all the pixel data from all the photo-electric transfer devices in the area sensor, the image data compensation processes can be executed in high precision and the high resolution image can be obtained. By amplifying the image data by the most proper level of the gain, a high quality image can be realized.

When the second imaging condition setting subroutine is completed, the imaging controller 23 controls the imaging device 21 for taking the image of the object to be recorded in the external recording medium 8. The image data taken by the imaging device 21 is temporarily memorized in the image data temporary memory 22, and the color data of R, G and B with respect to each pixel are obtained by the above-mentioned interpolation (#155).

When the color data are interpolated, the scene judger 31 executes a second scene judging subroutine for judging the scene of the image in the image taking state (#160).

Figure 12:
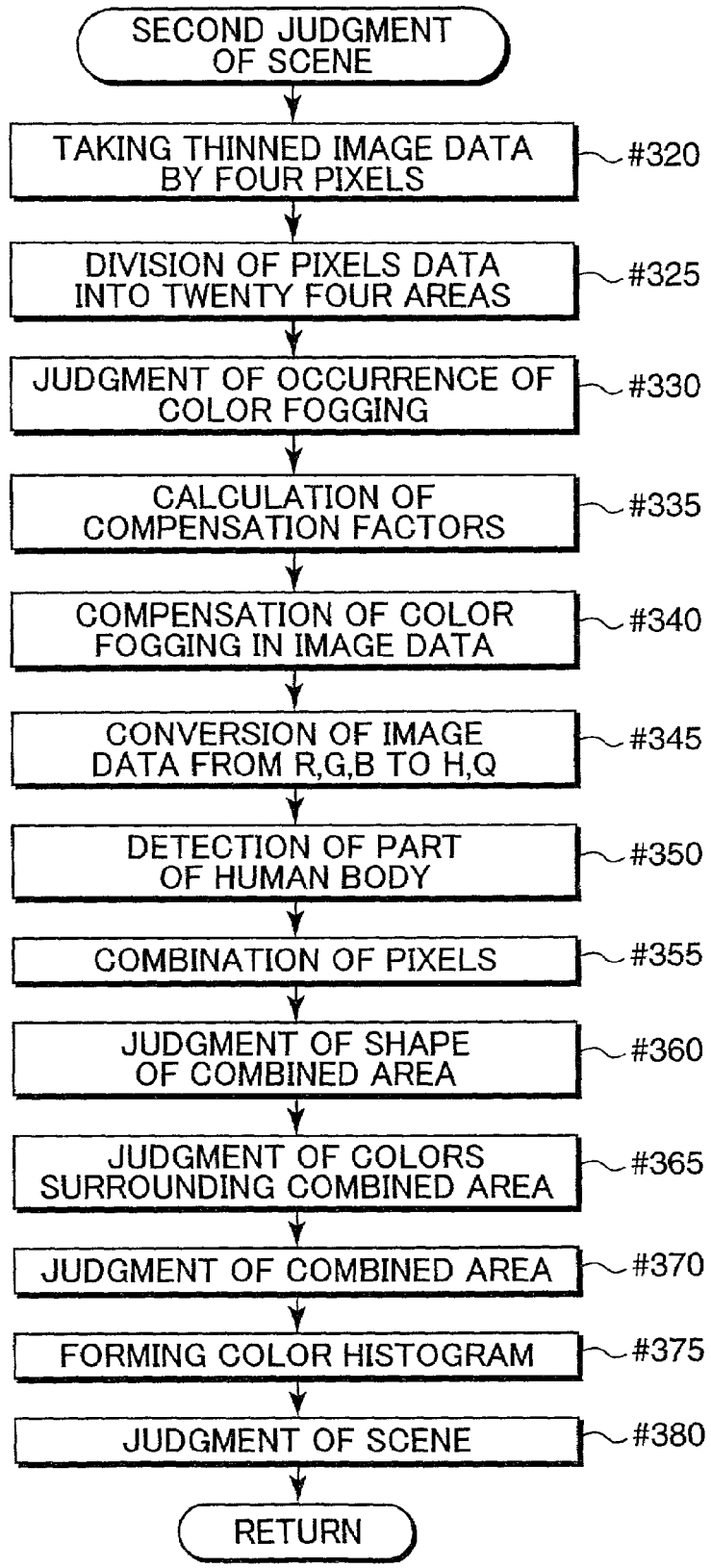
FIG. 12 is a flowchart for showing a second scene judging subroutine in step #160 in the main routine.

FIG. 12 is a flowchart of the second scene judging subroutine in step #160. When the second scene judging subroutine starts, the image data is thinned out by a predetermined number (for example, four) of the pixels, and the thinned pixel data are taken (#320). Since the image taking mode is selected, the pixel data outputted from the area sensor of the imaging device 21 is thinned by four pixels. In the above-mentioned preparation state, the pixel data are thinned out by 24 pixels, so that the second judgment of the scene is executed with a fine pitch of the pixel data than that in the preparation state.

Subsequently, the thinned pixel data are further divided into a plurality of areas, for example, twenty four areas divided by six portions in the X-direction and four portions in the Y-direction (#325). The occurrence of the color fogging is judged with respect to each area by calculating the values Kr(n) and Kb(n) by following the above-mentioned equations (1) to (3) (#330). Furthermore, the compensation factors Δr, Δg and Δb are calculated (#335). The image data are compensated for canceling the affect due to the color fogging by using the compensation factors Δr, Δg and Δb by following the above-mentioned equations (8) to (10) (#340).

In the image taking state, the judgment of the occurrence of the color fogging and the calculation of the compensation factors are executed similar to those in the preparation state. However, the numbers of the pixel data and the number of the divided area in the image taking state is much larger than those in the preparation state, so that the second judgment of the scene in the image taking state is more precisely executed than that in the preparation state.

Subsequently, the image data based on the R, G and B color signals are converted to other image data based on hue (H) and compensated chroma (Q) by following the above-mentioned equations (11) and (12) (#345). By comparing the values H and Q with respect to each area with these ranges shown by the above-mentioned formulae (13) and (14), it is judged whether at least a part of human body is included in the object or not (#350).

Subsequently, a plurality of pixels which can be regarded as the part of human body around the candidate area in the preparation state are combined as the same portion of the object (#355). The shape of the combined area formed by the continuous pixels in the X-direction and in the Y-direction are judged (#360). Colors surrounding the combined area are further judged (#365). It is judged whether the combined area is a part of human body or not by basing on the shape of the combined area and the colors surrounding the combined area (#370).

For example, hair exists above the human face, so that the areas having a color of black, brown, blond color, silver, or the like are continuously existed surrounding the human face portion. At this time, the image data are already compensated so as to reduce the affect of the color fogging, so that the judgment of the color surrounding the combined area can precisely and easily be executed.

Subsequently, a color histogram is formed with respect to each area divided in #325 (#375). The judgment of the scene in the image taking state is executed by using the information with respect to the existence of a part of human body and the information with respect to the color histogram (#380).

Hereupon, the judgment of the scene by using the information with respect to the existence of a part of human body and the information with respect to the color histogram is described with reference to table 1 shown in FIG. 22.

As can be seen from table 1, the scenes are classified as snapshot (S1), portrait (S2), commemoration (S3), landscape (S4), twilight view (S5), night view (S6), night portrait (S7), ocean view (S8), fluorescent lamp (S9) and tungsten lamp (S10).

The snapshot (S1) is a normal scene which is judged except the scenes (S2) to (S10). In the portrait (S2), a human face portion occupies largely in the frame of the photograph. The portrait (S2) is judged when the size of a part of human body is large and no color fogging occurs.

In the commemoration (S3), at least a person stands in front of a specific structure. The commemoration (S3) is judged when the size of a part of human body is middle or small and no color fogging occurs.

In the landscape (S4), a landscape photograph far from the camera user is taken. The landscape (S4) is judged when no part of human body exists in the frame of the photograph and no color fogging with respect to a specific color occurs.

In the twilight view (S5), a landscape or a person becomes rosy under an evening glow. The twilight view (S5) is judged when a ratio of red is higher than ratios of other colors in at least a part of the frame of the photograph with no relation to the existence of a part of human body.

In the night view (S6), point light sources are existed or a structure is illuminated in the dark. The night view (S6) is judged when no part of human body exists and the dark portion and the bright portion are included.

In the night portrait (S7), a person stands in the dark. The night portrait (S7) is judged when the size of a part of human body is middle or large and the dark portion and the bright portion are included.

In the ocean view (S8), there is a possibility that a person stands on the sea side. Thus, the ocean view (S8) is judged when a ratio of blue is higher than ratios of other colors in at least a part of the frame of the photograph with no relation to the existence of a part of human body.

In the fluorescent lamp (S9), the main object is illuminated by fluorescent lamp. The fluorescent lamp (S9) is judged when a ratio of blue-green is higher in the whole of the frame of the photograph due to the blue fogging by the fluorescent lamp with no relation to the existence of a part of human body.

In the tungsten lamp (S10), the main object is illuminated by tungsten lamp. The tungsten lamp (S10) is judged when a ratio of red is higher in the whole of the frame of the photograph due to the red fogging by the tungsten lamp with no relation to the existence of a part of human body.

Furthermore, it is possible to judge the scene with consideration of other information such as a distance to the object, a magnification of the image with respect to the object, which are not shown in table 1. By such the consideration, the precision of the judgment of the scene can be increased.

Returning to the main routine shown in FIG. 7, a second image data compensation subroutine is executed subsequent to the above-mentioned second scene judging process in step #160. A main object is decided by basing on the result of judgment of the scene, and a compensation process is executed to the image data proper to the scene and the kind of the main object (#165).

Figure 13:
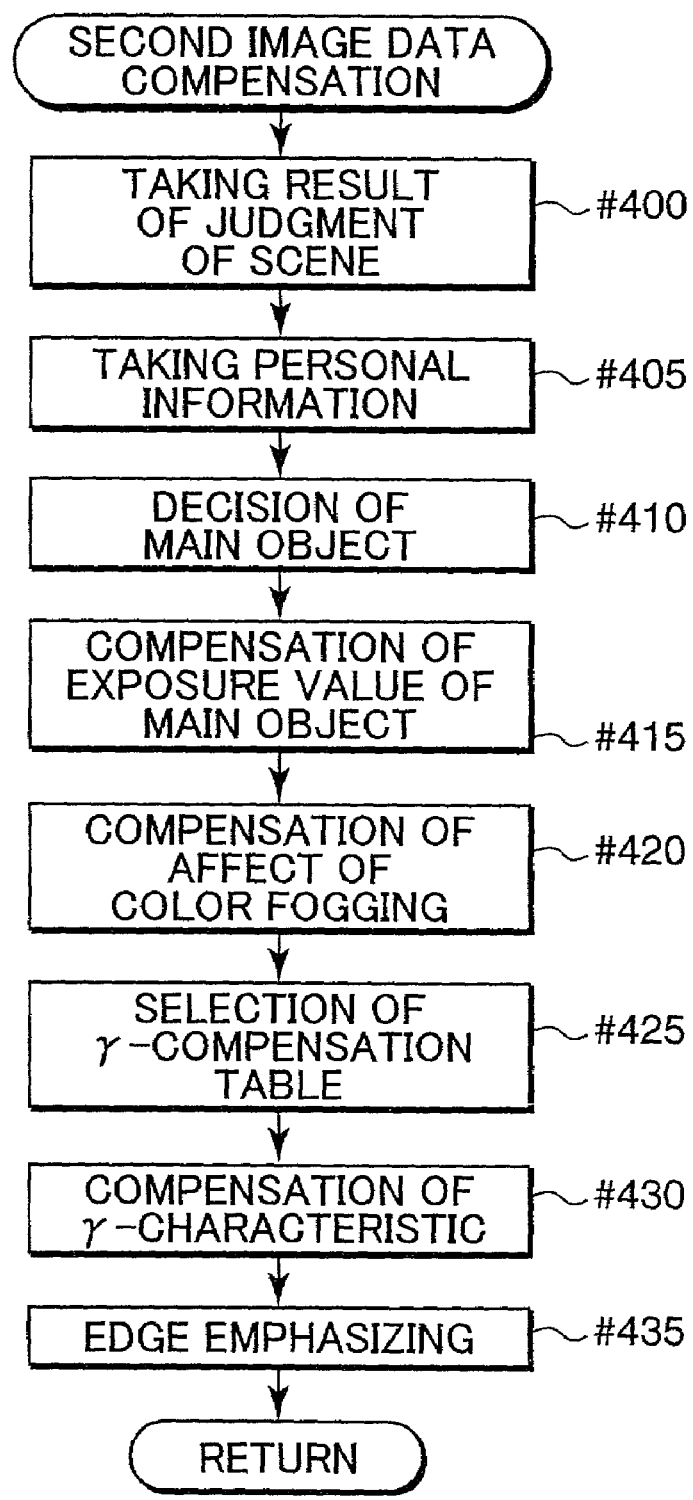
FIG. 13 is a flowchart for showing a second image data compensation subroutine in step #165 in the main routine.

FIG. 13 is a flowchart of the second image data compensation subroutine in step #165. When the second image data compensation subroutine starts, the information of the result of judgment of the scene is taken (#400). Subsequently, the person information that a part of human body is included in the object or not is taken (#405), and the main object is decided by using the result of judgment of the scene and the person information (#410).

When the main object is decided, the exposure value is compensated so as to make the exposure of the main object be proper (#415). Hereupon, when the exposure value is digitally designated by eight bit signal (0 to 255), the proper exposure value is defined that an averaged luminance LY of the main object satisfies the formula $100 \leq LY \leq 150$. The averaged luminance LY is calculated by the following equation (15), when the image data with respect to the principal colors of red, green and blue are designated by symbols R, G and B.

$$LY=0.299R+0.587G+0.114B \quad (15)$$

When the exposure value is compensated, the affect of the color fogging is properly compensated corresponding to the result of judgment of the scene (#420). Subsequently, a γ-compensation table corresponding to the scene is selected among a plurality of (for example, four) kinds of γ-compensation table (#425), and the γ-characteristic of the image data is compensated by using the selected γ-compensation table (#430). Furthermore, edge emphasizing process is executed to the image data with using filters corresponding to the scene (#435).

Hereupon, an example of the compensation of the image data corresponding to the scene is described with reference to FIGS. 14A to 14D and 15A to 15C and table 2 shown in FIG. 23.

Figure 14A:
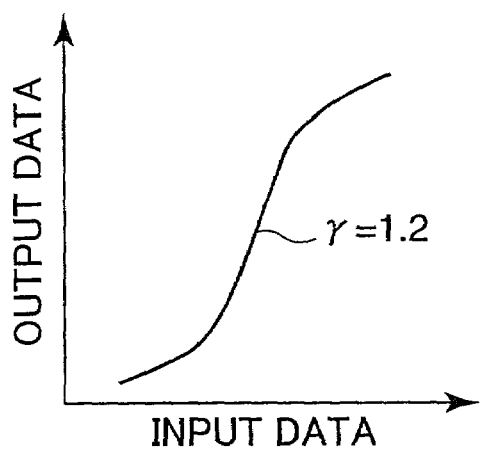
FIGS. 14A to 14D are graphs for showing γ-characteristic curves respectively having different values which are used for compensating image data corresponding to scene of a photograph in the embodiment.
Figure 14B:
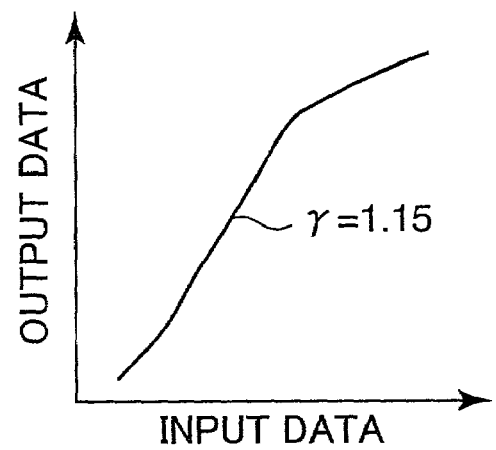
Figure 14C:
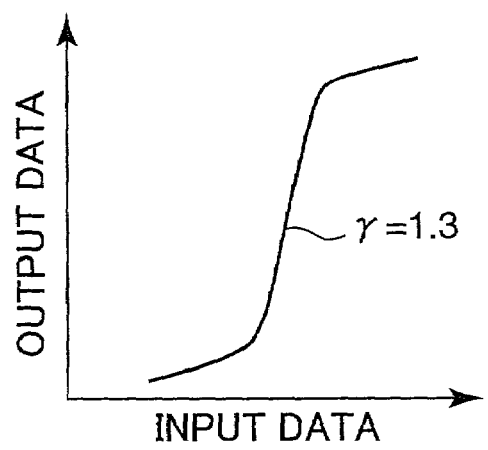
Figure 14D:
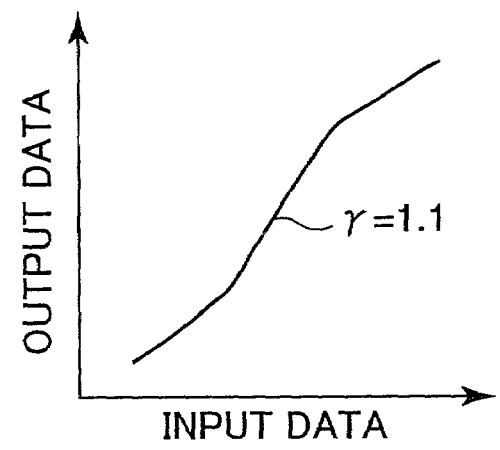

FIG. 14A shows a γ-characteristic curve of γ=1.2. FIG. 14B shows a γ-characteristic curve of γ=1.15. FIG. 14C shows a γ-characteristic curve of γ=1.3. FIG. 14D shows a γ-characteristic curve of γ=1.1. In this embodiment, four kinds of lookup tables corresponding to the γ-characteristic curves shown in FIGS. 14A to 14D are previously memorized in a memory. Alternatively, it is possible to memorize formulae in the memory for calculating the compensation of the γ-characteristics.

FIG. 15A shows an arrangement of filters for emphasizing the edge of the main object strongly. FIG. 15B shows an arrangement of filters for emphasizing the edge of the main object to a middle degree. FIG. 15C shows an arrangement of filters for emphasizing the edge of the main object weakly.

As can be seen from table 2 shown in FIG. 23, when the scene is judged as the snapshot (S1), a normal white balancing compensation for adjusting the gain of color signals of R, G and B is executed as the color balancing compensation. A normal γ-compensation for compensating the contrast to be middling is executed by using the lookup table corresponding to the γ-characteristic curve shown in FIG. 14A. Furthermore, a normal edge emphasizing compensation using the filter shown in FIG. 15B having a middle degree of the edge emphasizing effect is executed.

When the scene is judged as the portrait (S2), a biased white balancing compensation for adjusting the gain of color signals of R, G and B without damaging the color of a part of human body is executed as the color balancing compensation. A weak γ-compensation for compensating the contrast to be weak is executed by using the lookup table corresponding to the γ-characteristic curve shown in FIG. 14D for realizing the soft focus effect. Furthermore, a weak edge emphasizing compensation using the filter shown in FIG. 15C having a small degree of the edge emphasizing effect is executed.

When the scene is judged as the commemoration (S3), the biased white balancing compensation for adjusting the gain of color signals of R, G and B without damaging the color of a part of human body is executed as the color balancing compensation. With respect to the clarity of the image, it is preferable to compensate the contrast normally, so that the normal γ-compensation for compensating the contrast to be middling is executed by using the lookup table corresponding to the γ-characteristic curve shown in FIG. 14A. Furthermore, the normal edge emphasizing compensation using the filter shown in FIG. 15B having a middle degree of the edge emphasizing effect is executed.

When the scene is judged as the landscape (S4), the whole of the frame of the photograph is the main object, so that no color balancing compensation is executed. Since the angle of view is wider in the landscape, it is necessary to compensate the contrast highly and to emphasize the edge strongly so as to reproduce the image clearly. Thus, a strong γ-compensation for compensating the contrast to be higher is executed by using the lookup table corresponding to the γ-characteristic curve shown in FIG. 14C. Furthermore, a strong edge emphasizing compensation using the filter shown in FIG. 15A having a high degree of the edge emphasizing effect is executed.

When the scene is judged as the twilight view (S5), no color balancing compensation is executed so as not to damage the rosy color of the twilight. In considering the wide angle of view such as the commemoration, it is preferable to compensate the contrast and the edge emphasizing normally. Thus, the normal γ-compensation for compensating the contrast to be middling is executed by using the lookup table corresponding to the γ-characteristic curve shown in FIG. 14A. Furthermore, the normal edge emphasizing compensation using the filter shown in FIG. 15B having a middle degree of the edge emphasizing effect is executed.

When the scene is judged as the night view (S6), a weak white balancing compensation is executed as the color balancing compensation so as not to damage the atmosphere of the night, in which the adjusting quantities of the gain is reduced to be near to "1" than the normal white balancing compensation. A weak γ-compensation for compensating the contrast to be lower is executed by using the lookup table corresponding to the γ-characteristic curve shown in FIG. 14B. Furthermore, the normal edge emphasizing compensation using the filter shown in FIG. 15B having a middle degree of the edge emphasizing effect is executed.

When the scene is judged as the night portrait (S7), the main object is a person in the dark background, so that the exposure value is compensated that the exposure of a part of human body as the main object becomes proper. The weak white balancing compensation is executed as the color balancing compensation so as not to damage the atmosphere of the night. Since the main object is a person, the weak γ-compensation for compensating the contrast to be lower is executed by using the lookup table corresponding to the γ-characteristic curve shown in FIG. 14B. Furthermore, the normal edge emphasizing compensation using the filter shown in FIG. 15B having a middle degree of the edge emphasizing effect is executed.

When the scene is judged as the ocean view (S8), it is supposed the season is the summer. No color balancing compensation is executed so as not to damage the atmosphere of the strong sun shine. The strong γ-compensation for compensating the contrast to be higher is executed by using the lookup table corresponding to the γ-characteristic curve shown in FIG. 14C. Furthermore, the strong edge emphasizing compensation using the filter shown in FIG. 15A having a high degree of the edge emphasizing effect is executed.

When the scene is judged as the fluorescent lamp (S9), the affect of the color fogging due to the fluorescent lamp is compensated, and the normal white balancing compensation is executed. The normal γ-compensation for compensating the contrast to be middling is executed by using the lookup table corresponding to the γ-characteristic curve shown in FIG. 14A. Furthermore, the normal edge emphasizing compensation using the filter shown in FIG. 15B having a middle degree of the edge emphasizing effect is executed.

When the scene is judged as the tungsten lamp (S10), the affect of the color fogging due to the tungsten lamp is weakly compensated so as to remain the rosy atmosphere of the tungsten lamp a little, and the normal white balancing compensation is executed. The compensation coefficient is close to "1", e.g. "0.9". The normal γ-compensation for compensating the contrast to be middling is executed by using the lookup table corresponding to the γ-characteristic curve shown in FIG. 14A. Furthermore, the normal edge emphasizing compensation using the filter shown in FIG. 15B having a middle degree of the edge emphasizing effect is executed.

Returning to the main routine shown in FIG. 7, an image using the compensated image data is displayed on the monitor display device 4 (#170). Subsequently, the image information selector 33 executes an image information settling subroutine so as to select the information with respect to the judgment of the image and the compensation processes (#175).

Figure 16:
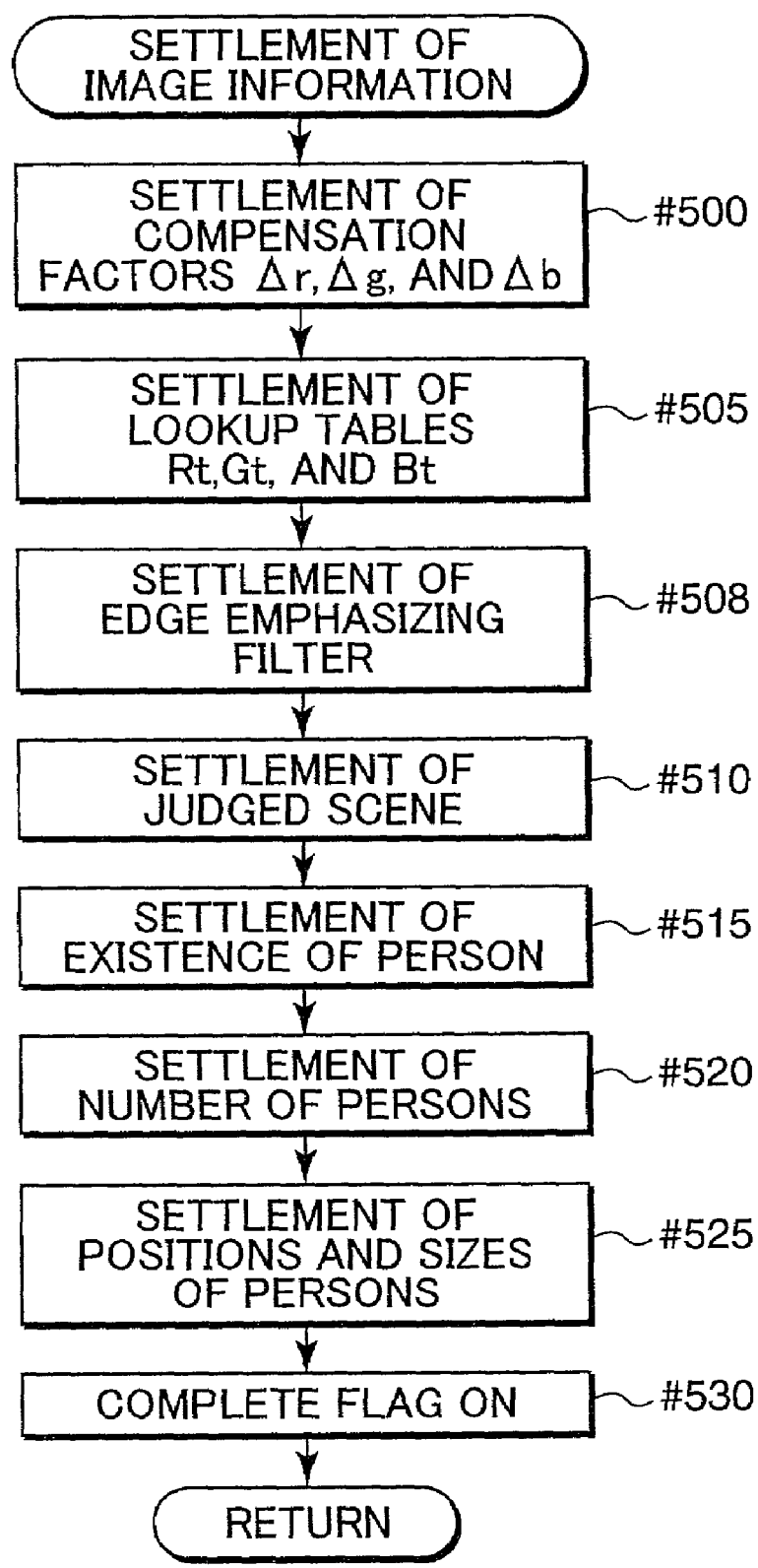
FIG. 16 is a flowchart for showing an image information settling subroutine in step #170 in the main routine.

FIG. 16 is a flowchart of the image information settling subroutine in step #170. When the image information settling subroutine starts, the compensation factors Δr, Δg and Δb for compensating the color signals of R, G and B are settled (#500). The lookup tables Rt, Gt and Bt of the γ-compensation which are used for compensating the γ-characteristic curves of respective principal colors are settled (#505). The information with respect to the edge emphasizing filter used for emphasizing the edge of the main object is settled (#508). The information with respect to the result of judgment of the scene is settled (#510). The information with respect to the existence of a part of human body (person) in the frame of the photograph is settled (#515). When a part of human body exists, the number of the parts of human body (number of persons) is settled (#520), and the positions and the sizes of the parts of human body are settled (#525). Finally, a completion flag for showing the image information setting processes are completed is switched on (#530).

Subsequently, recording image data which is to be recorded in the external recording medium 8 is formed by composing the image information settled in step #175 and the original image data outputted from the imaging device 21 (#180).

FIG. 17 shows an example of the recording image data. In this example, three persons are included in the frame of the photograph. In step #505, the γ-compensation data are settled as the form of the lookup tables. It, however, is possible to settled the γ-compensation data are settled as the form of the formulae used for compensating the γ-characteristics. Furthermore, it is possible to use a predetermined symbol, for example, "1" of continuous four bits as the completion flag switched on in step #530. Still furthermore, it is possible to record the data with respect to filters shown in FIGS. 15A to 15C.

When the recording image data are recorded in the external recording medium 8 in step #185, the sequence controller 25 shits to a standby state. Alternatively, it is possible to return to step #105 after step #185.

As mentioned above, the information with respect to the judgment of the image such as the scene or the kind of main object and the information with respect the compensation such as the color compensation are recorded with the image data. Thus, it is possible to use these information so as to output an image with a proper quality when the image is outputted by an external device, e.g. outputted by a printer or reproduced on a monitor display of a personal computer.

Generally, it is difficult to retrieve information with respect to a person in a frame of a photograph from an image data only, even though the information with respect to a person is effective for outputting the image properly. On the other hand, a distance information to the object, a magnification information of the image with respect to the object, an information whether the object is moving or not can be obtained further to the image data when the image is taken. By utilizing these information, it is possible to retrieve a person in the photograph relatively easily. Thus, it is preferable to record the information with respect to a person in the digital still camera.

An example to judge the information of moving object and to retrieve a person in the photograph by using the information of moving object is described.

For judging whether the object is moving or not, a present image is compared with another image taken before a predetermined time, for example, one second and calculating a variation of averaged luminance LY between the images. When the color signals of red, green and blue are designated by the symbols R, G and B, the averaged luminance LY can be calculated by the above-mentioned equation (15).

At first, averaged values of variations of luminance LY in predetermined areas in the vicinity of four corners of a frame of a photograph are detected as quantities of camera shake ($B_X$, $B_Y$). Subsequently, the image data taken before the predetermined time is shifted by $B_X$ in the X-direction and $B_Y$ in the Y-direction, and the shifted image data are compared with the present image data for obtaining a difference of the luminance LY. An area in which the difference is not zero is retrieved as the moving object.

When a color of the retrieved area is included in the variation of color of human skin, it is judged that the retrieved area corresponds to a part of human body. Furthermore, the shape of the retrieved area is obtained. When the shape of the retrieved area is circular, it is supposed to be a face. When the shape of the retrieved area is oblong, it is supposed as arm or leg.

In this embodiment, the occurrence of the color fogging is judged by using averaged color value of the pixel data included in each divided area. It, however, is possible to judge the occurrence of the color fogging by forming color histograms. In the latter case, number of degrees in a predetermined width of gradation around the R, G and B color data are substituted in the values Rave(n), Gave(n) and Bave(n) of the above-mentioned equations (1) and (2) instead of the averaged values of the color data.

Furthermore, in this embodiment, the thinning ratio in the preparation state is varied from that in the image taking state. Instead of this operation or adding to this operation, it is possible to vary the resolution of the image data in the preparation state from that in the image taking state. For example, the analog output signal from the area sensor in the imaging device 21 is converted to digital data of six bits by the A/D converter of the imaging device 21 in the preparation state, and the analog output signal from the area sensor is converted to digital data of ten bits in the image taking state. By such the modification, it is possible to process the image data quickly in the preparation state, and to obtain a high quality image in the image taking state.

Still furthermore, in this embodiment, the image data basing on the R, G and B color signals are converted to another image data basing on the hue (H) and the compensated chroma (Q). It is, however, possible to convert the image data to still another image data, for example, in the u'v' color space. In the latter case, the image data basing on the R, G and B color signals are converted to the image data basing on the u'v' color space by the following equations (16) and (17).

$$u' = (11.1R + 7.0G + 4.5B)/(17.8R + 70.8G + 18.8B) \tag{16}$$

$$v' = (9.0R + 41.3G + 0.54B)/(17.8R + 70.8G + 18.8B) \tag{17}$$

Subsequently, a range of variation of color of human skin is selected as following formulae (18) and (19) for judging whether the retrieved area corresponds to a part of human body or not.

$$0.225 \leq u' \leq 0.270 \tag{18}$$

$$0.470 \leq v' \leq 0.505 \tag{19}$$

Since the image data based on the u'v' color space may not be affected by the variation of luminance, it is possible to retrieve a part of human body.

Figure 18:
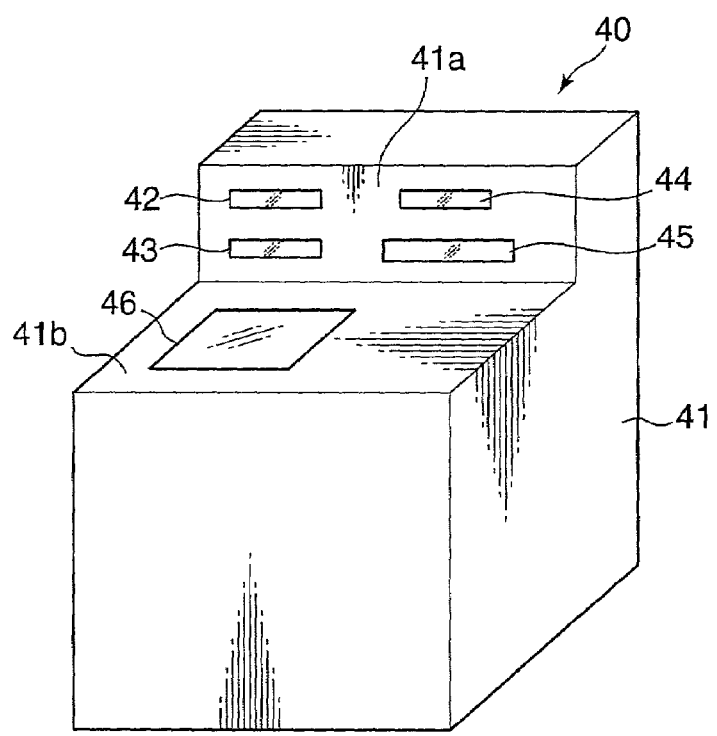
FIG. 18 is a perspective view for showing an appearance of a printer which is an example of an image outputting apparatus in the embodiment.
Figure 19:
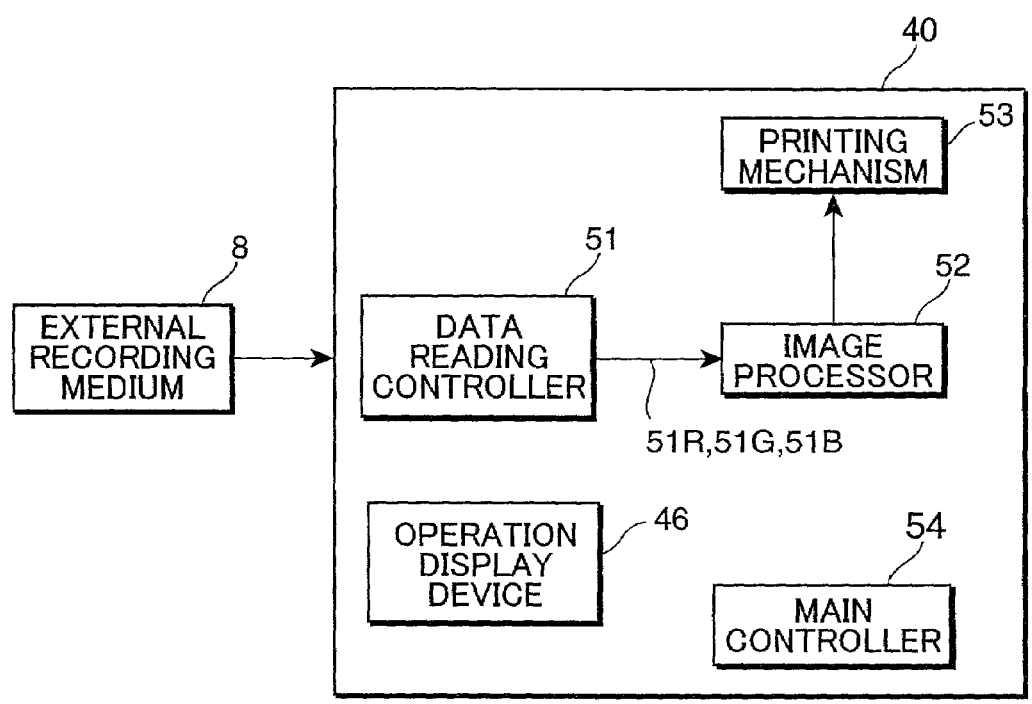
FIG. 19 shows a block diagram for showing a configuration of the printer in the embodiment.

Subsequently, an image outputting apparatus in accordance with this embodiment is described. FIG. 18 shows an appearance of a printer which is an example of the image outputting apparatus. FIG. 19 shows a block diagram of the printer.

As can be seen from FIG. 18, the printer 40 has a plurality of memory data readers 42, 43 and 44 corresponding to the kinds of the external recording medium 8. Insertion openings of the memory data readers 42, 43 and 44 from which the external recording medium 8 is inserted are provided on a upper front face 41a of a housing 41. Furthermore, an ejecting opening 45 from which a recording paper of an image is ejected is provided on the upper front face 41a. An operation display device 46 on which operation information is displayed is provided on a top face 41b of the housing 41.

As the external recording medium 8, several kinds of recording media such as a memory card, a CD-R, a floppy disk (FD), a magneto-optical disc (MO), and so on can be used. The operation display device 46 is configured so that a transparent switch panel is provided above an LCD panel. A user can input his selection, such as the selection of the image to be printed, a number of printing papers, a size of the printing paper, and so on, by following the instruction displayed on the LCD panel.

A data reading controller 51 shown in FIG. 19 reads out the data recorded in the external recording medium 8 through one of the memory data readers 42, 43 and 44, and outputs to an image processor 52. In FIG. 19, color image signals 51R, 51G and 51B respectively designate the image data corresponding to the principal colors of red, green and blue.

When the image information is included with the image data in the data recorded in the external recording medium 8 as shown in FIG. 17, the image processor 52 executes predetermined compensation processes to the image data using the image information. Thus, the image processor 52 has the following first to fourth functions.

The first function is a compensation process of luminance for compensating the color image signals 51R, 51G and 51B in a manner so that the luminance at a position of a part of human body shown by the image information becomes proper. Hereupon, when the exposure value is digitally designated by eight bit signal (0 to 255), the proper exposure value is defined that an averaged luminance LY of the main object satisfies the formula $100 \leq LY \leq 150$. When the values of the color image signals 51R, 51g and 51B are designated by the symbols R, G and B, the averaged luminance LY can be calculated by the above-mentioned equation (15).

The second function is a color balancing process for compensating ratios of color image signals 51R, 51G and 51B in a manner so that the color data at the position of a part of human body is to be included in the ranges shown by the above-mentioned formulae (13) and (14). By the second function, a part of human body such as a face can properly be reproduced. It is possible to memorize the ranges shown by the above-mentioned formulae (13) and (14) into a memory of a main controller 54. Alternatively, it is possible to input the ranges through the operation display device 46 by the user.

The third function is the edge emphasizing process for emphasizing the edge of the main object and for varying the degree of the emphasis corresponding to the scene included in the image information. By the third function, the image in which the edge of the main object is properly emphasized can be reproduced.

The fourth function is the selection of the γ-compensation curve corresponding to the scene among a plurality of γ-compensation curves previously memorized in the memory of the main controller 54. The γ-compensation curves are formed for compensating the γ-characteristic curves of the original image data so as to compensate properly with consideration of reflection characteristics depending on a printing method in a printing mechanism 53 or kind of inks used in the printing mechanism 53.

The printing mechanism 53 prints an image on a printing paper by using an image data compensated by the image processor 52. The main controller 54 comprises the above-mentioned memory, and controls the operation display device 46, the data reading controller 51, the image processor 52, and the printing mechanism 53 for reproducing the image on the recording paper.

Figure 20:
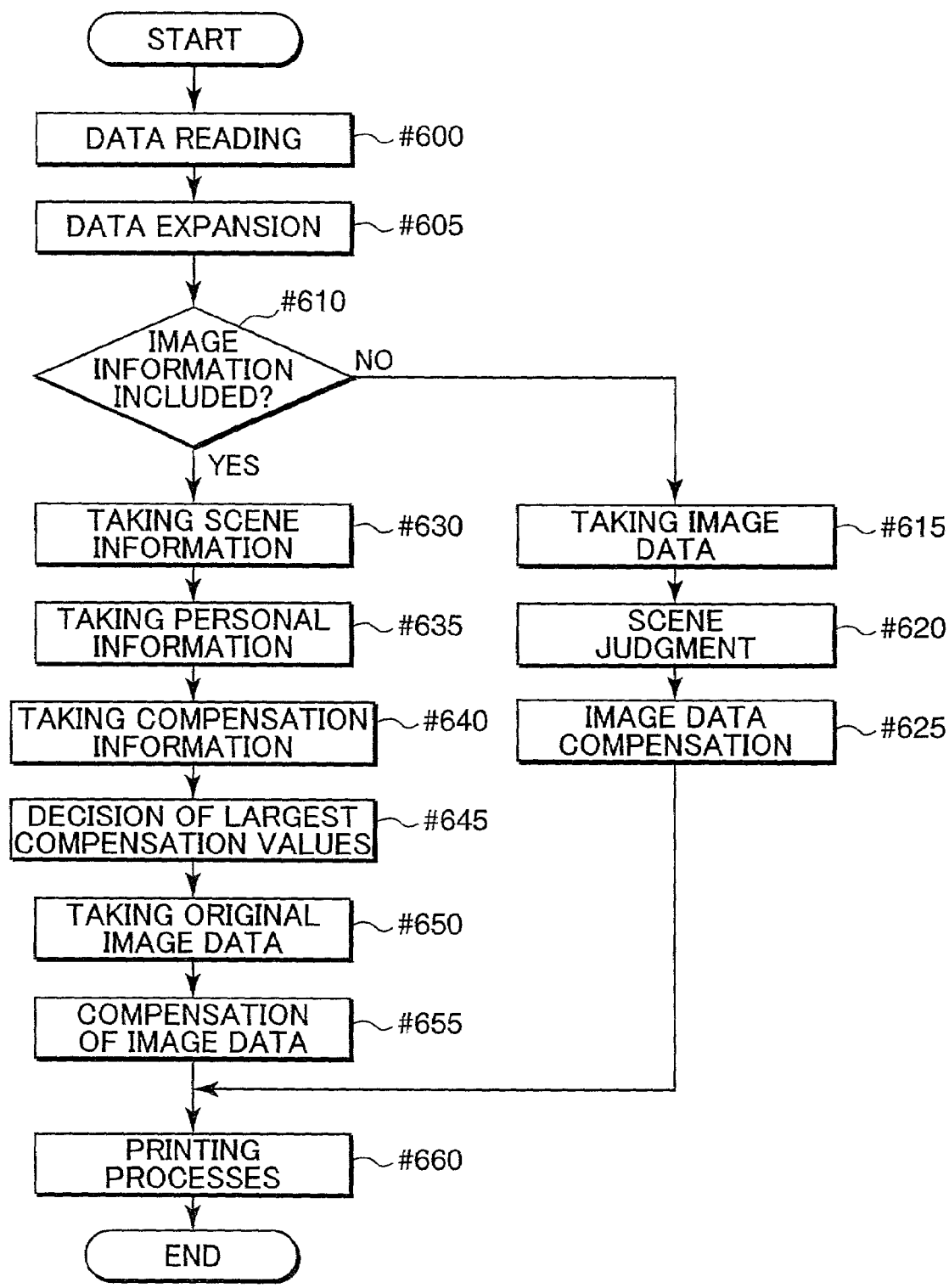
FIG. 20 is a flowchart for showing a main flow of an operation of the printer in the embodiment.

FIG. 20 shows a main flow of the operation of the printer 40. When the external recording medium 8 is inserted into the memory data reader 42, 43 or 44, the data is read out from the external recording medium 8 (#600).

The readout data is expanded (#605) and judged whether the image information is included in the read out data or not (#610). When the image information is not included in the readout data (NO in step #610), the image data is taken out from the readout data (#615). The judgment of the scene is executed by using the image data (#620), and the image data is compensated corresponding to the judged scene (#625). Subsequently, an image is printed on a printing paper by the printing mechanism 53 (#660).

Since the image information is not included in the readout data, it is difficult to judge the scene from the image data only. If the compensation of the image data is executed corresponding to misjudged scene, the quality of the image reproduced on the printing paper will be damaged. For preventing the damage of the misjudgment, the compensation of the image data is restrictively executed. On the contrary, when the image information is added to the image data, the misjudgment of the scene rarely occurs. Thus, it is possible to execute the following high quality compensation of the image data.

When the image information is included in the readout data (YES in step #610), the information with respect to the scene is taken out from the readout data (#630). For example, when the scene is the twilight view, night view or ocean view, the normal compensation of the image data is not executed so as not to lose the characteristic atmosphere of the object. Since the quantities for compensating the color balancing and the exposure value are different corresponding to the scene, the information with respect to the scene is used in step #655 which will be described below.

Subsequently person information such as the existence of a part of human body, the number and position(s) of the part(s) of human body, and so on are taken out from the readout data (#635). Since the person information is difficult to judge from the image data only, it is preferable to utilized the person information included in the readout data for compensating the image data so as to make the exposure value and the color balancing with respect to the object of a person be proper.

When the person information is taken, the compensation information with respect to the compensation processes of the color balancing, the γ-compensation, and so on are taken from the readout data (#640). By taking the compensation information which are executed in the digital still camera, it is possible not only to prevent the loss of the compensation of the image data executed in the digital still camera but also to prevent the unrealistic compensation will be executed in the printer in step #655.

Subsequently, the largest compensation quantities are decided so as not to compensate the image data superfluously (#645). For example, the largest compensation quantities are decided as follows. When the compensation factors $\Delta r$ and $\Delta b$ recorded in the image information are $\Delta r=0.6$ and $\Delta b=1.5$, the largest ranges of the compensation factors $\Delta r$ and $\Delta b$ become $0.5 \leq \Delta r \leq 2.0$ and $0.5 \leq \Delta b \leq 2.0$.

Thus, the ranges in which the color compensation can be executed during the printing processes of the image become $0.5/0.6 \leq \Delta rp \leq 2.0/0.6$ and $0.5/1.5 \leq \Delta bp \leq 2.0/1.5$.

That is, $0.83 \leq \Delta rp \leq 3.33$ and $0.33 \leq \Delta bp \leq 1.33$.

Hereupon, the symbol $\Delta rp$ designates the compensation factor of red in the printing processes and the symbol $\Delta bp$ designates the compensation factor of blue in the printing processes. By such the process, the ranges in which the color compensation can be executed are decided as the largest compensation quantities based on the compensation factors recorded in the image information and the largest widths corresponding to the characteristics of the compensation factors.

Subsequently, an original image data is taken (#650), and the compensation processes are executed to the original image data (#655). These compensation processes are executed with using the information taken in steps #630 to #640, the largest compensation quantities decided in step #645 and the characteristic data of the printing mechanism 53 such as the color reproduction regions, the reflection characteristics, the γ-characteristic curves and the filters for emphasizing the edges of the image. These characteristic data of the printer 40 are memorized in the memory of the main controller 53.

Finally, an image reproducing process is executed by using the processed image data (#660).

By the above-mentioned printer in accordance with this embodiment, a high quality and clear image can be printed by executing the compensation processes of the exposure value, the color balancing, and so on properly, with respect to the images including at least a part of human body such as a face which is larger than a predetermined size.

With respect to another image such as the landscape without including a part of human body, it is possible to compensate the image data by using the information with respect to the scene so as to finish the print clearly and finely. Thus, the landscape photograph can be reproduced finely without the consideration of the color reproduction of the color of human skin.

In the above-mentioned embodiment, the printer 40 is explained as an example of the image outputting apparatus in accordance with this embodiment. It, however, is possible to apply the block diagram shown in FIG. 19 to a personal computer system comprising a main body of a personal computer including a data reading controller 51, an image processor 52 and a main controller 51, a key board, a mouse, an operation display device 46 such as a CRT or a LCD, and a printer 53 connected to the main body of the personal computer by a cable.

By such the application, it is possible to configure an image outputting apparatus by which the image can be outputted from not only the printer 53, but also the monitor display device 46.

Furthermore, it is possible to configure an image processing system by the digital still camera 1 shown in FIG. 2 and the printer 40 or the personal computer system shown in FIG. 19.

In this modification, in the digital still camera 1, the image information including the information with respect to the judgment of image such as the scene and the existence of a person and the information with respect to the compensation executed to the image data are attached with the image data which are stored as the recording data. On the other hand, in the printer 40, the image information attached with the image data are used for printing the clear and fine image. By such the configuration, it is possible to realize the image processing system by which the imaging and reproducing the image can be executed properly.

Figure 21:
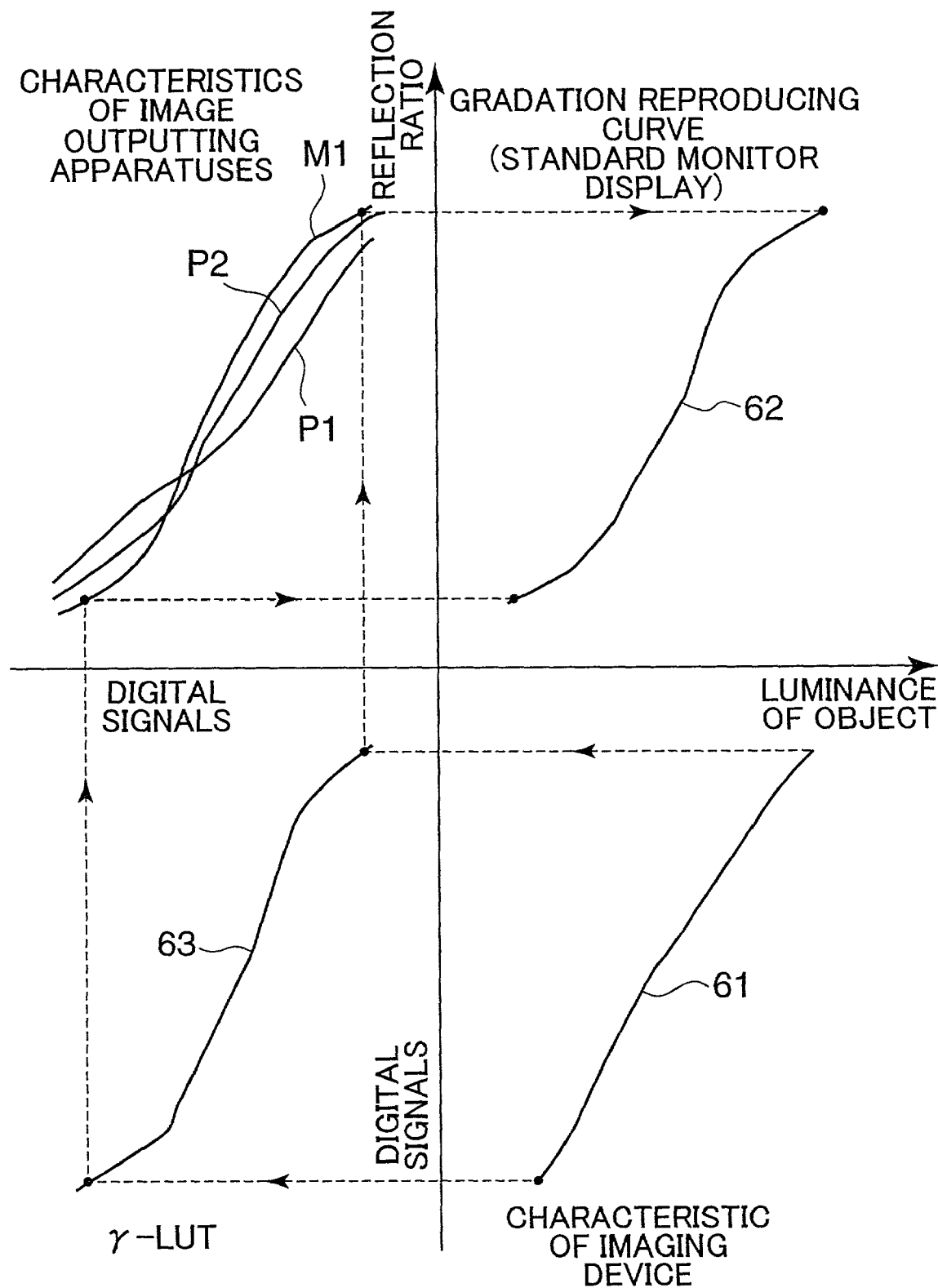
FIG. 21 is a graph for showing a conception for reproducing a digital image data in the image outputting apparatus based on an image data taken by an imaging apparatus in the embodiment.

An image reproducing process using the digital data is described with reference to FIG. 21. FIG. 21 shows the conception for reproducing the digital image data.

In FIG. 21, a characteristic curve 61 illustrated in lower right quadrant shows a relation between a luminance value of an object and an output digital value outputted from the imaging device 21 of the digital still camera 1 shown in FIG. 2. A characteristic curve 63 illustrated in lower left quadrant shows a relation between an input value and an output value of a γ-lookup table (γ-LUT). A characteristic curve M1 illustrated in upper left quadrant shows a reflection characteristic M1 of a standard monitor display. A characteristic curve 62 illustrated in upper right quadrant shows a gradation reproducing curve which is a desired image characteristic when an image is displayed on the standard monitor display in consideration of the reflection characteristic curve M1 of the standard monitor display. A characteristic curve P1 illustrated in upper left quadrant shows a reflection characteristic of an inkjet type printer. A characteristic curve P2 illustrated in upper left quadrant shows a reflection characteristic of a dye-sublimation printer.

When an image of an object is taken by the digital still camera 1, optical energy of the image focused on the area sensor of the imaging device 21 is photo-electrically converted to analog electric signals, and the analog electric signals are converted to digital signals by the A/D converter of the imaging device 21 corresponding to the characteristic curve 61.

The digital still camera generally has a γ-lookup table corresponding to the characteristic curve 63 so as to realize the gradation reproducing curve 62. The digital signals outputted from the imaging device 21 are converted by the γ-LUT. When an image is displayed on the standard monitor display, it is found that the image is displayed following to the gradation reproducing characteristic curve 62, since the γ-LUT is formed with the consideration of the reflection characteristic curve M1 of the standard monitor display.

As mentioned above, the digital still camera executes the compensation processes to the image data proper when the image is displayed on the standard monitor display. Since the proper gradation reproducing characteristic differs corresponding to the kind of the scene, a plurality of γ-LUTs are prepared corresponding to the kinds of the scenes, and the most proper one is selected corresponding to the judgment of the scene.

When the image is outputted by printing on the recording paper, the image reproducing characteristics such as the reflection characteristics, the color reproducing characteristics, the range of the color reproduction will be different from those of the standard monitor display corresponding to the printing type, the kinds of pigment or dye of the ink of the printer. As can be seen from FIG. 21, the reflection characteristic P1 of the inkjet type printer and the reflection characteristic P2 of the dye-sublimation printer are different from the reflection characteristic M1 of the standard monitor display.

Since the printer is required to print the image clearly and finely on the recording paper, the printer executes not only the compensation of the image data for compensating the reflection characteristics thereof with respect to the standard monitor display, but also the inherent color conversion corresponding to the kind of the printer itself.

In the image outputting apparatus in accordance with this embodiment, the image data are compensated by using the information with respect to the existence of a person, the kind of the scene and the compensation, and the image is reproduced with using the compensated image data in step #655 in the flowchart shown in FIG. 20. By such the configuration, the image of the object can be reproduced properly corresponding to the characteristics of the printers and the monitor displays such as the CRT and the LCD.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An imaging apparatus comprising:
    an imaging device for taking an image of an object and for outputting an image data of the object;
    a condition judger for judging conditions of the object using the image data outputted from the imaging device;
    an image data compensator for compensating the image data corresponding to the result of judgment by the condition judger;
    a compensation information selector for selecting information with respect to compensation processes executed by the image data compensator;
    a recording data former for forming recording data by adding the selected information to the compensated image data; and
    a recorder for recording the recording data into a recording medium.

2. The imaging apparatus in accordance with claim 1, wherein the information with respect to the compensation processes includes at least one of information of exposure characteristics, color balancing characteristics, γ-characteristics and edge emphasizing characteristics.

3. An imaging apparatus comprising:
    an imaging device for taking an image of an object and for outputting an image data of the object;
    a condition judger for judging conditions with respect to the object by using the image data outputted from the imaging device;
    an image data compensator for compensating the image data corresponding to the result of judgment by the condition judger;
    an image judgment information selector for selecting information with respect to the result of judgment of conditions with respect to the object by the condition judger;
    a recording data former for forming recording data by adding the selected information with respect to the result of judgment to the compensated image data; and
    a recorder for recording the recording data into a recording medium.

4. The imaging apparatus in accordance with claim 3, wherein the information with respect to the result of judgment includes at least one of scene information and person information.

5. An image outputting apparatus comprising:
    a data input device for taking recording data including image data of an image and information with respect to the image from external equipment;
    an image data output compensator for compensating the image data using the information with respect to the image included in the recording data;
    an image outputting mechanism for outputting an image; and
    an image output controller for controlling the image outputting mechanism so as to output an image by using the compensated image data; wherein
    the image output compensator executes compensation processes to the image data corresponding to output characteristics of the image outputting mechanism.

6. The image outputting apparatus in accordance with claim 5, wherein the recording data is taken from a recording media which is recorded by a recorder of an imaging apparatus,
    the imaging apparatus comprises:
    an imaging device for taking an image of an object and for outputting an image data of the object;
    a condition judger for judging conditions of the object using the image data outputted from the imaging device;
    an image data input compensator for compensating the image data corresponding to the result of judgment by the condition judger;
    a compensation information selector for selecting information with respect to compensation processes executed by the image data input compensator;
    a recording data former for forming recording data by adding the selected information to the compensated image data; and
    the recorder for recording the recording data into the recording medium.

7. The image outputting apparatus in accordance with claim 6, wherein the information with respect to the compensation processes executed by the input compensator includes at least one of information of exposure characteristics, color balancing characteristics, γ-characteristics and edge emphasizing characteristics.

8. The image outputting apparatus in accordance with claim 5, wherein the recording data is taken from a recording media which is recorded by a recorder of an imaging apparatus,
    the imaging apparatus comprises:
    an imaging device for taking an image of an object and for outputting an image data of the object;
    a condition judger for judging conditions with respect to the object by using the image data outputted from the imaging device;
    an image data compensator for compensating the image data corresponding to the result of judgment by the condition judger;

an image judgment information selector for selecting information with respect to the result of judgment of conditions with respect to the object by the condition judger;

a recording data former for forming recording data by adding the selected information with respect to the result of judgment to the compensated image data; and the recorder for recording the recording data into the recording medium.

9. The image outputting apparatus in accordance with claim 8, wherein the information with respect to the result of judgment includes at least one of scene information and person information.

10. An image processing system configured by an imaging apparatus and an image outputting apparatus, wherein the imaging apparatus comprising:

an imaging device for taking an image of an object and for outputting an image data of the object;

a condition judger for judging conditions of the object using the image data outputted from the imaging device;

an image data input compensator for compensating the image data corresponding to the result of judgment by the condition judger;

a compensation information selector for selecting information with respect to compensation processes executed by the image data input compensator;

a recording data former for forming recording data by adding the selected information to the compensated image data; and a recorder for recording the recording data into a recording medium; and the image outputting apparatus comprising:

a data input device for taking the recording data from the recording medium;

an image data output compensator for compensating the image data included in the recording data using the selected information with respect to the image included in the recording data;

an image outputting mechanism for outputting an image; and an image output controller for controlling the image outputting mechanism so as to output an image by using the image data compensated by the output compensator; wherein the output compensator executes compensation processes to the image data corresponding to output characteristics of the image outputting mechanism.

11. The image processing system in accordance with claim 10, wherein the selected information includes at least one of information of exposure characteristics, color balancing characteristics, γ-characteristics and edge emphasizing characteristics.

12. An image processing system configured by an imaging apparatus and an image outputting apparatus, wherein the imaging apparatus comprising:

an imaging device for taking an image of an object and for outputting an image data of the object;

a condition judger for judging conditions with respect to the object by using the image data outputted from the imaging device;

an image data compensator for compensating the image data corresponding to the result of judgment by the condition judger;

an image judgment information selector for selecting information with respect to the result of judgment of conditions with respect to the object by the condition judger;

a recording data former for forming recording data by adding the selected information with respect to the result of judgment to the compensated image data; and a recorder for recording the recording data into a recording medium; and the image outputting apparatus comprising:

a data input device for taking the recording data from the recording medium;

an image data output compensator for compensating the image data included in the recording data using the selected information with respect to the image included in the recording data;

an image outputting mechanism for outputting an image; and an image output controller for controlling the image outputting mechanism so as to output an image by using the image data compensated by the output compensator; wherein the output compensator executes compensation processes to the image data corresponding to output characteristics of the image outputting mechanism.

13. The image processing system in accordance with claim 12, wherein the information with respect to the result of judgment includes at least one of scene information and person information.

14. An imaging apparatus comprising:

an imaging device including a plurality of photo-electro transfer elements which are two-dimensionally arranged and outputting an image data of an object by taking an image of the object;

an operation member which can be operated from outside of the imaging apparatus;

a display device for displaying an image;

an operation controller selecting a preparation state which is a stage prior to an image taking operation corresponding to a first operation of the operation member, and executing the image taking operation for recording image data of an object corresponding to a second operation of the operation member;

a first judger for judging a condition with respect to the object using first data obtained by executing a first process to first image data output from the imaging device in the preparation state;

a second judger for judging a condition with respect to the object using second data obtained by executing a second process to second image data output from the imaging device when the second operation is executed by the operation member;

an image data compensator for executing a first compensation process to the first image data corresponding to result of judgment by the first judger in the preparation state, and for executing a second compensation process to the second image data corresponding to result of judgment by the second judger when the second operation is executed by the operation member;

a display controller for displaying the image of the object using the first image data to which the first compensation process is executed in the preparation state; and a recording controller for recording the second image data to which the second compensation process is executed when the image taking operation is executed.

15. The imaging apparatus in accordance with claim 14, wherein
the first judger executes a first data retrieving process for retrieving data from pixel data output from the photo-electro transfer elements of the imaging device by thinning at a first pitch as the first process, and judges the condition with respect to the object with using the retrieved data; and
the second judger executes a second data retrieving process for retrieving data from pixel data output from the photo-electro transfer elements of the imaging device by thinning at a second pitch smaller than the first pitch as the second process, and judges the condition with respect to the object with using the retrieved data.

16. The imaging apparatus in accordance with claim 14, wherein
the first judger executes a first data dividing process for dividing pixel data output from the photo-electro transfer elements of the imaging device into m-number of areas ("m" is an integer equal to or larger than two) as the first process, and judges the condition with respect to the object with using the data included in each area; and
the second judger executes a second data dividing process for dividing pixel data output from the photo-electro transfer elements of the imaging device into n-number of areas ("n" is an integer larger than "m") as the second process, and judges the condition with respect to the object with using the data included in each area.

17. The imaging apparatus in accordance with claim 14, wherein the first judger and the second judger respectively judge at least one of scene, position of a main object and a position of a person as the condition with respect to the object.

18. An imaging apparatus comprising:
an imaging device including a plurality of photo-electro transfer elements which are two-dimensionally arranged and outputting an image data of an object by taking an image of the object;
an operation member which can be operated from outside of the imaging apparatus;
a display device for displaying an image;
an operation controller selecting a preparation state which is a stage prior to an image taking operation corresponding to a first operation of the operation member, and executing the image taking operation for recording image data of an object corresponding to a second operation of the operation member;
a first judger for judging a condition with respect to the object using first image output from the imaging device in the preparation state;
a second judger for judging a condition with respect to the object using second image data output from the imaging device when the second operation is executed by the operation member;
a first image data compensator for executing a first compensation process to the first image data corresponding to result of judgment by the first judger;
a second image data compensator for executing a second compensation process to the second image data corresponding to result of judgment by the second judger;
a display controller for displaying the image of the object using the first image data to which the first compensation process is executed in the preparation state; and
a recording controller for recording the second image data to which the second compensation process is executed when the image taking operation is executed.

19. The imaging apparatus in accordance with claim 18, wherein
the second image data compensator executes compensation processes to the second image data with respect to a plurality of characteristics; and
the first image data compensator executes compensation processes to the first image data with respect to a part of the characteristics.

20. The imaging apparatus in accordance with claim 19, wherein the characteristics includes at least an exposure value, color balancing characteristics and γ-characteristics, and the first image data compensator executes the compensation processes with respect to the exposure value and the color balancing characteristics.

21. The imaging apparatus in accordance with claim 18, wherein the first image data compensator calculates a compensation quantity of the first image data corresponding to the result of the judgment by the first judger, and executes the first compensation process using a predetermined level as the compensation quantity when the calculated compensation quantity is equal to or larger than the predetermined level.

* * * * *